US012337371B1

(12) United States Patent
Warner et al.

(10) Patent No.: US 12,337,371 B1
(45) Date of Patent: Jun. 24, 2025

(54) SYSTEMS AND METHODS FOR ASSEMBLING LIQUID DESICCANT AIR CONDITIONER PANELS USING FLEXIBLE ALIGNMENT FEATURES

(71) Applicant: Copeland LP, Sidney, OH (US)

(72) Inventors: Jason Warner, Greenville, OH (US); Douglas P. Pelsor, Plain City, OH (US); Chris Cicenas, Etna, OH (US); Jeffery J. Langhals, Lima, OH (US); Anthony J. Kramer, Osgood, OH (US); Robert Chilton, Celina, OH (US)

(73) Assignee: Copeland LP, Sidney, OH (US)

( * ) Notice: Subject to any disclaimer, the term of this patent is extended or adjusted under 35 U.S.C. 154(b) by 0 days.

(21) Appl. No.: 18/390,475

(22) Filed: Dec. 20, 2023

(51) Int. Cl.
*B21D 53/04* (2006.01)
*B23P 15/26* (2006.01)

(52) U.S. Cl.
CPC .............. *B21D 53/04* (2013.01); *B23P 15/26* (2013.01); *F28F 2275/06* (2013.01)

(58) Field of Classification Search
CPC .......... B23K 2101/045; B23K 2101/14; B23P 15/26; B21D 53/04; F48F 2275/06
See application file for complete search history.

(56) References Cited

U.S. PATENT DOCUMENTS

| | | |
|---|---|---|
| 2,537,276 A | 1/1951 | Mcmahon et al. |
| 3,814,172 A | 6/1974 | Shore |
| 3,973,621 A | 8/1976 | Bow et al. |
| 4,373,347 A | 2/1983 | Howell et al. |
| 4,582,126 A | 4/1986 | Corey |
| 4,653,287 A | 3/1987 | Martin, Jr. |
| 4,903,503 A | 2/1990 | Meckler |
| 4,941,324 A | 7/1990 | Peterson et al. |
| 5,005,371 A | 4/1991 | Yonezawa et al. |
| 5,320,166 A | 6/1994 | Swenson |
| 5,943,874 A | 8/1999 | Maeda |
| 6,039,112 A | 3/2000 | Ruppel et al. |
| 6,134,903 A | 10/2000 | Potnis et al. |
| 6,178,762 B1 | 1/2001 | Flax |
| 6,216,483 B1 | 4/2001 | Potnis et al. |

(Continued)

FOREIGN PATENT DOCUMENTS

| | | |
|---|---|---|
| CN | 102213471 B | 1/2013 |
| CN | 103063076 B | 3/2015 |

(Continued)

OTHER PUBLICATIONS

Machine Translation of WO 2015/086915 A1 (Year: 2015).*

*Primary Examiner* — Christopher J. Besler
(74) *Attorney, Agent, or Firm* — Armstrong Teasdale LLP

(57) ABSTRACT

Methods of assembling a multilayer panel for use in a heat exchanger. An example method includes positioning a frame on a work platform, the frame having two header sections and a middle section, the middle section defining a heat transfer fluid area and each header section defining a frame alignment feature; positioning a heat exchange sheet on the frame across the middle section and each header section, the heat exchange sheet having two sheet alignment features each corresponding to one of the frame alignment features; inserting an alignment pin of the work platform into each pair of corresponding frame and sheet alignment features; and welding the heat exchange sheet to the frame.

17 Claims, 18 Drawing Sheets

(56) References Cited

U.S. PATENT DOCUMENTS

| | | |
|---|---|---|
| 6,282,919 B1 | 9/2001 | Rockenfeller et al. |
| 6,315,257 B1 | 11/2001 | Fennesz |
| 6,494,053 B1 | 12/2002 | Forkosh et al. |
| 6,497,107 B2 | 12/2002 | Maisotsenko et al. |
| 6,837,056 B2 | 1/2005 | Potnis et al. |
| 6,848,265 B2 | 2/2005 | Lowenstein et al. |
| 6,892,797 B2 | 5/2005 | Beddome et al. |
| 7,086,249 B2 | 8/2006 | Bae et al. |
| 7,147,071 B2 | 12/2006 | Gering et al. |
| 7,163,052 B2 | 1/2007 | Taras et al. |
| 7,260,945 B2 | 8/2007 | Landry |
| 7,269,966 B2 | 9/2007 | Lowenstein et al. |
| 7,306,650 B2 | 12/2007 | Slayzak et al. |
| 7,398,819 B2 | 7/2008 | Taras et al. |
| 7,806,171 B2 | 10/2010 | Taras et al. |
| 7,819,177 B2 | 10/2010 | Beamer et al. |
| 7,905,107 B2 | 3/2011 | Forkosh et al. |
| 8,171,986 B2 | 5/2012 | Klein |
| 8,171,987 B2 | 5/2012 | Jiang et al. |
| 8,205,668 B2 | 6/2012 | Freese, V |
| 8,222,514 B2 | 7/2012 | Hanoka |
| 8,268,060 B2 | 9/2012 | Hargis et al. |
| 8,800,308 B2 | 8/2014 | Vandermeulen et al. |
| 8,999,045 B2 | 4/2015 | Ericson et al. |
| 9,101,874 B2 | 8/2015 | Vandermeulen |
| 9,109,808 B2 | 8/2015 | Gerber et al. |
| 9,130,503 B2 | 9/2015 | Vandermeulen |
| 9,140,471 B2 | 9/2015 | Kozubal et al. |
| 9,234,665 B2 | 1/2016 | Erb et al. |
| 9,267,696 B2 | 2/2016 | Gerlach et al. |
| 9,276,274 B2 | 3/2016 | Boersma et al. |
| 9,423,140 B2 | 8/2016 | Betts et al. |
| 9,470,426 B2 | 10/2016 | Vandermeulen |
| 9,506,697 B2 | 11/2016 | Vandermeulen |
| 9,518,765 B2 | 12/2016 | Laughman et al. |
| 9,631,848 B2 | 4/2017 | Vandermeulen et al. |
| 9,709,285 B2 | 7/2017 | Vandermeulen |
| 9,746,174 B2 | 8/2017 | Wilhelm et al. |
| 9,810,439 B2 | 11/2017 | Coutu et al. |
| 10,012,444 B2 | 7/2018 | Eplee |
| 10,024,558 B2 | 7/2018 | Vandermeulen |
| 10,041,708 B2 | 8/2018 | Sedlak et al. |
| 10,323,867 B2 | 6/2019 | Vandermeulen |
| 10,352,574 B2 | 7/2019 | Hamlin et al. |
| 10,386,084 B2 | 8/2019 | Bahar et al. |
| 10,465,996 B2 | 11/2019 | Wintersteen et al. |
| 10,619,867 B2 | 4/2020 | Vandermeulen |
| 10,655,870 B2 | 5/2020 | Lowenstein |
| 10,712,024 B2 | 7/2020 | LePoudre et al. |
| 10,739,079 B2 | 8/2020 | Lowenstein |
| 10,782,045 B2 | 9/2020 | LePoudre et al. |
| 10,905,997 B2 | 2/2021 | McGee et al. |
| 10,921,001 B2 | 2/2021 | Allen et al. |
| 10,941,948 B2 | 3/2021 | Vandermeulen et al. |
| 10,950,877 B2 | 3/2021 | Staeck |
| 10,962,252 B2 | 3/2021 | LePoudre et al. |
| 11,022,330 B2 | 6/2021 | Allen et al. |
| 11,029,045 B2 | 6/2021 | Woods et al. |
| 11,035,618 B2 | 6/2021 | LePoudre et al. |
| 11,092,349 B2 | 8/2021 | LePoudre et al. |
| 11,131,468 B2 | 9/2021 | Edström et al. |
| 11,143,467 B2 | 10/2021 | Lynn et al. |
| 11,408,681 B2 | 8/2022 | LePoudre |
| 11,608,996 B2 | 3/2023 | Meggers et al. |
| 11,737,239 B2 | 8/2023 | LePoudre |
| 11,781,775 B2 | 10/2023 | Abdel-Salam et al. |
| 11,815,283 B2 | 11/2023 | Ghadiri Moghaddam et al. |
| 2003/0029185 A1 | 2/2003 | Kopko |
| 2004/0211207 A1 | 10/2004 | Forkosh et al. |
| 2006/0201188 A1 | 9/2006 | Kopko |
| 2010/0090356 A1 | 4/2010 | Sines et al. |
| 2010/0132930 A1 | 6/2010 | Izenson et al. |
| 2011/0139218 A1 | 6/2011 | Hanoka et al. |
| 2012/0006483 A1 | 1/2012 | Hanoka et al. |
| 2013/0227982 A1 | 9/2013 | Forkosh |
| 2014/0260367 A1 | 9/2014 | Coutu et al. |
| 2015/0260420 A1 | 9/2015 | Forkosh |
| 2015/0300754 A1 | 10/2015 | Vandermeulen et al. |
| 2016/0138817 A1 | 5/2016 | Hamlin et al. |
| 2016/0377302 A1 | 12/2016 | Hamlin et al. |
| 2017/0106639 A1 | 4/2017 | Vandermeulen et al. |
| 2017/0205090 A1 | 7/2017 | Hollering et al. |
| 2017/0205154 A1 | 7/2017 | Torre La et al. |
| 2017/0363305 A1 | 12/2017 | Hamlin et al. |
| 2018/0156544 A1 | 6/2018 | Alahyari et al. |
| 2019/0145640 A1 | 5/2019 | Vandermeulen et al. |
| 2019/0154281 A1 | 5/2019 | Rosenblum et al. |
| 2019/0162429 A1 | 5/2019 | Armatis et al. |
| 2020/0096212 A1 | 3/2020 | LePoudre |
| 2020/0173672 A1 | 6/2020 | Rowe et al. |
| 2020/0182493 A1 | 6/2020 | Luttik |
| 2020/0363091 A1 | 11/2020 | Umekage et al. |
| 2022/0003464 A1 | 1/2022 | Sakaguchi |
| 2022/0099390 A1 | 3/2022 | Dean |
| 2022/0376329 A1 | 11/2022 | Nakamura et al. |
| 2022/0393260 A1 | 12/2022 | Nakamura et al. |

FOREIGN PATENT DOCUMENTS

| | | | |
|---|---|---|---|
| CN | 105737302 A | 7/2016 | |
| DE | 102006024796 B4 | 11/2009 | |
| EP | 1810856 A3 | 11/2008 | |
| EP | 1769207 B1 | 4/2009 | |
| EP | 2309193 A1 | 4/2011 | |
| EP | 2966386 A1 | 1/2016 | |
| EP | 2796802 B1 | 3/2016 | |
| EP | 2960953 B1 | 4/2018 | |
| EP | 3117157 B1 | 8/2018 | |
| EP | 3361171 B1 | 8/2019 | |
| EP | 3764021 A1 | 1/2021 | |
| FR | 2886388 B1 | 10/2007 | |
| GB | 479311 A | 2/1938 | |
| GB | 757856 A | 9/1956 | |
| SG | 10201605802 A1 | 2/2017 | |
| WO | 1995010746 A1 | 4/1995 | |
| WO | 1996019708 A1 | 6/1996 | |
| WO | 2001073366 A1 | 10/2001 | |
| WO | 2013094206 A1 | 6/2013 | |
| WO | 2013172789 A1 | 11/2013 | |
| WO | WO-2015086915 A1 * | 6/2015 | ........... B23K 20/021 |
| WO | 2017185002 A1 | 10/2017 | |
| WO | 2017185005 A1 | 10/2017 | |
| WO | 2018191805 A1 | 10/2018 | |
| WO | 2019162949 A1 | 8/2019 | |
| WO | 2020026040 A1 | 2/2020 | |
| WO | 2020026084 A3 | 5/2020 | |
| WO | 2022216155 A1 | 10/2022 | |

* cited by examiner

SYSTEMS AND METHODS FOR ASSEMBLING LIQUID DESICCANT AIR CONDITIONER PANELS USING FLEXIBLE ALIGNMENT FEATURES

FIELD

The field relates generally to heating, ventilation, and air conditioning (HVAC) systems, and more particularly, to systems and methods for assembling multilayer panels (or panel assemblies) used in a three-way heat exchanger operable to transfer heat between a heat transfer fluid, a liquid desiccant, and air.

BACKGROUND

Heating, ventilation, and air conditioning (HVAC) systems are known for their heating, cooling, and moisture removal capabilities for treating outside air that is circulated through an indoor space. The vapor compression cycle is widely used in HVAC systems to regulate the temperature and humidity of the outside air. Typically, outside air is cooled below its dew point temperature to allow moisture in the air to condense on an evaporator coil, thus dehumidifying the air. Since this process often leaves the dehumidified air at an uncomfortably cold temperature, the air is then reheated to a temperature more comfortable to a user. The process of overcooling and reheating the air can become very energy-intensive and costly.

In some applications, HVAC systems include a vapor compression system used in combination with a liquid desiccant dehumidification system to remove moisture from the outside air without cooling it below its dew point temperature. For example, HVAC systems may include a refrigerant sub-system that operates under the vapor compression cycle and an air treatment sub-system that uses heat transfer fluid and liquid desiccant to simultaneously absorb heat (sensible cooling) and moisture (latent cooling) from warm outside air to produce cooled and dehumidified indoor air. The air treatment sub-system may include three-way heat transfer equipment that facilitates sensible and latent cooling of the warm outdoor air using the heat transfer fluid and the liquid desiccant.

In operation of a three-way heat exchanger, the liquid desiccant and heat transfer fluid are channeled through the heat exchanger and heat is transferred between the liquid desiccant and the heat transfer fluid. An outdoor air stream is directed through the heat exchanger, and heat transfer fluid absorbs heat from the air stream while the liquid desiccant absorbs moisture from the air stream. The liquid desiccant may circulate between the three-way heat exchanger and a regeneration system, in which diluted liquid desiccant rejects the absorbed moisture into a sacrificial fluid. The refrigerant sub-system interfaces with the air treatment sub-system, whereby refrigerant in an evaporation stage of the vapor compression cycle absorbs heat from the heat transfer fluid in the three-way heat exchanger. The refrigerant is then channeled to a condensing stage in which the refrigerant rejects the absorbed heat into another fluid. Liquid desiccant treated by the regeneration system and heat transfer fluid treated by the refrigerant sub-system is then channeled back toward the three-way heat exchanger to again provide sensible and latent cooling of outside air.

Three-way heat exchangers may include panels that channel the heat transfer fluid and the liquid desiccant therethrough for absorbing heat and moisture from the air stream that flows between the panels. The heat transfer fluid and liquid desiccant may flow through the panels and distribute across respective flow channels in each panel. There is an ongoing need for improvements in the design and/or manufacturability of the panels that facilitate reducing costs and/or optimizing operation and efficiency of the heat exchanger.

This background section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. These statements are to be read in this light, and not as admissions of prior art.

SUMMARY

One aspect is a method of assembling a multilayer panel for use in a heat exchanger, the method including: positioning a frame on a work platform, the frame having two header sections and a middle section, the middle section defining a heat transfer fluid area and each header section defining a frame alignment feature; positioning a heat exchange sheet on the frame across the middle section and each header section, the heat exchange sheet having two sheet alignment features each corresponding to one of the frame alignment features; inserting an alignment pin of the work platform into each pair of corresponding frame and sheet alignment features; and welding the heat exchange sheet to the frame.

Another aspect is a method of assembling a multilayer panel for use in a heat exchanger, the method including: positioning a frame on a work platform, the frame having two header sections and a middle section, the middle section defining a heat transfer fluid area and each header section defining a header area; positioning a heat exchange sheet on the frame across the middle section and each header section; welding the heat exchange sheet to the frame to form a middle weld enveloping the heat transfer fluid area and two outer welds each enveloping one of the header areas; and controlling alignment between the frame and the heat exchange sheet during welding.

Another aspect is a method of assembling a multilayer panel for use in a heat exchanger, the method including: attaching a membrane to a heat exchange sheet, the heat exchange sheet including two series of apertures located at opposite ends of the heat exchange sheet, wherein the membrane extends across the two series of apertures such that a desiccant channel is defined between the membrane and the heat exchange sheet and is connected to each series of apertures; and attaching the heat exchange sheet having the membrane attached thereto to a frame, the frame having two header sections and a middle section, the middle section defining a heat transfer fluid area and each header section defining a header area, wherein the desiccant channel is separated from the heat transfer fluid area by the heat exchange sheet and connected to the header areas by the two series of apertures.

Various refinements exist of the features noted in relation to the above-mentioned aspects. Further features may also be incorporated in the above-mentioned aspects as well. These refinements and additional features may exist individually or in any combination. For instance, various features discussed below in relation to any of the illustrated embodiments may be incorporated into any of the above-described aspects, alone or in any combination.

BRIEF DESCRIPTION OF THE DRAWINGS

Corresponding reference characters indicate corresponding parts throughout the drawings.

DETAILED DESCRIPTION

Figure 1:
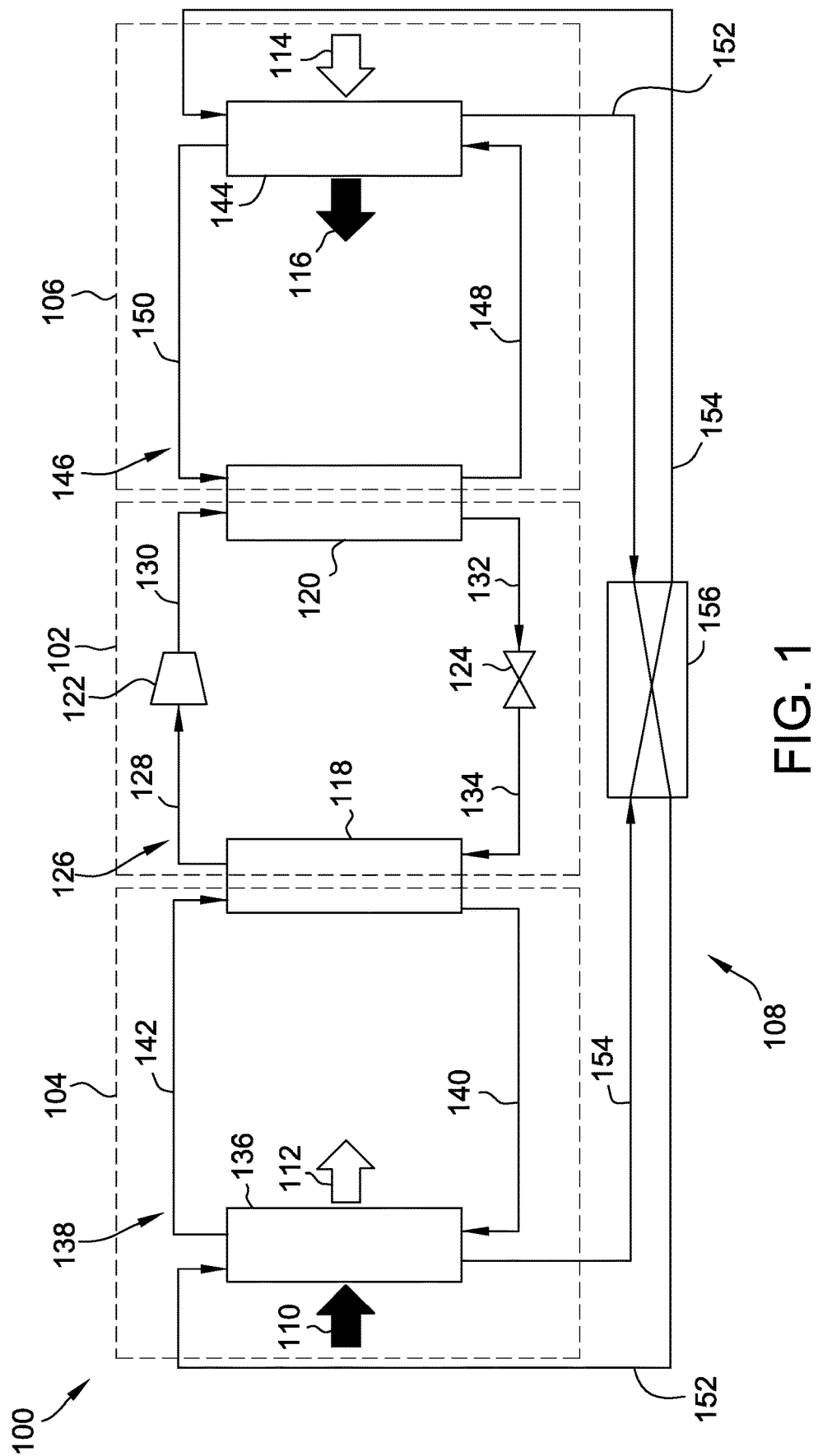
FIG. 1 is a schematic flow diagram of a heating, ventilation, and air conditioning (HVAC) system.

FIG. 1 is a schematic diagram of a heating, ventilation, and air conditioning (HVAC) system 100. The HVAC system 100 includes sub-systems 102-106 and a liquid desiccant circuit 108 which facilitate the heating, cooling, and moisture removal capabilities of the system 100. The sub-systems of the HVAC system 100 include a refrigerant sub-system 102, a conditioner sub-system 104, and a regenerator sub-system 106. The conditioner sub-system 104 and the regenerator sub-system 106 are usable to respectively treat first and second inlet air streams 110 and 114, and may be referred to herein as air treatment sub-systems 104 and 106. The HVAC system 100 may include additional components or other components than those shown and described with reference to FIG. 1.

In an example operating mode of the HVAC system 100, the conditioner sub-system 104 removes heat from the first inlet air stream 110 and channels a conditioned outlet air stream 112 to a conditioned space (not shown), such as an interior of a building structure or vehicle. The conditioned outlet air stream 112 exiting the conditioner sub-system 104 may have a lower temperature than the first inlet air stream 110. Heat removed from the first inlet air stream 110 is transferred from the conditioning sub-system 104, to the refrigerant sub-system 102, and finally to the regenerator sub-system 106. The regenerator sub-system 106 transfers the heat into the second inlet air stream 114 and channels a heated outlet air stream 116 to the atmosphere.

The refrigerant sub-system 102 includes an evaporator 118, a condenser 120, a compressor 122, and an expansion valve 124. The compressor 122 may be any suitable compressor including, but not limited to, scroll, reciprocating, rotary, screw, and centrifugal compressors. The expansion valve 124 may be any suitable expansion valve, such as a thermal expansion valve. The expansion valve 124 may alternatively be any suitable expansion device, such as an orifice or capillary tube for example. The refrigerant sub-system 102 also includes a refrigerant loop 126 that circulates a working fluid, such as a refrigerant, between the evaporator 118, the compressor 122, the condenser 120, and the expansion valve 124. The refrigerant sub-system 102 may include additional components or other components than those shown and described with reference to FIG. 1.

In an example operation of the refrigerant sub-system 102, the refrigerant in the loop 126 is channeled as a low pressure gas refrigerant 128 toward the compressor 122. The compressor 122 compresses the gas refrigerant 128, which raises the temperature and pressure of the refrigerant. Pressurized, high temperature gas refrigerant 130 exits the compressor 122 and is channeled toward the condenser 120, where the high pressure gas refrigerant 130 is condensed to a high pressure liquid refrigerant 132. The liquid refrigerant 132 exiting the condenser 120 is channeled toward the expansion valve 124 that reduces the pressure of the liquid. The reduced pressure fluid refrigerant 134, which may be a gas or a mixture of gas and liquid after passing through the expansion valve 124, is then channeled toward the evaporator 118. The fluid refrigerant 134 evaporates to a gas in the evaporator 118, exiting the evaporator as the low pressure gas refrigerant 128. The gas refrigerant 128 is then channeled back toward the compressor 122, where the gas refrigerant 128 is again compressed and the process repeats. Circulation of the refrigerant in the loop 126 may be driven by the compressor 122, and, more particularly, by a pressure differential that exists between the pressurized, high temperature gas refrigerant 130 exiting the compressor 122 and the low pressure gas refrigerant 128 entering the compressor 122. The direction of flow of the refrigerant through the loop 126, as shown in FIG. 1, may be reversed to switch the heat transfer functions of the evaporator 118 and the condenser 120, and enable the HVAC system 100 to operate in various operating modes.

The conditioner sub-system 104 includes a first three-way heat exchanger 136 and a conditioner heat transfer fluid loop 138 that circulates a conditioner heat transfer fluid (e.g., water, a glycol-based fluid, or any combination thereof) to and from the first three-way heat exchanger 136. The conditioner sub-system 104 interfaces with the refrigerant sub-system 102 via the evaporator 118. In particular, the evaporator 118 is included in the refrigerant loop 126 and the conditioner heat transfer loop 138, and facilitates transfer of heat from the conditioner heat transfer fluid in the loop 138 into the fluid refrigerant 134 in the refrigerant loop 126. The conditioner sub-system 104 may include additional components or other components than those shown and described with reference to FIG. 1. For example, the conditioner sub-system 104 may include one or more pumps (not shown) for circulating the conditioner heat transfer fluid in the loop 138 between the first three-way heat exchanger 136 and the evaporator 118. Suitable pumps that may be included in the conditioner sub-system 104 include, for example, centrifugal pumps, diaphragm pumps, positive displacement pumps, or any type of pump suitable for transferring liquid. The conditioner sub-system 104 may include additional heat transfer equipment that transfers heat from the conditioner heat transfer fluid into the atmosphere, or vice versa, depending on the operational requirements of the HVAC system 100 and other factors (e.g., a temperature and/or humidity of the first air inlet stream 110).

In an example operation of the conditioner sub-system 104, the conditioner heat transfer fluid in the loop 138 is channeled toward the evaporator 118. The conditioner heat transfer fluid is cooled in the evaporator 118 as heat is transferred from the conditioner heat transfer fluid into the fluid refrigerant 134 in the loop 126 to produce the gas refrigerant 128. Cooled conditioner heat transfer fluid 140 exiting the evaporator 118 is channeled toward and enters the first three-way heat exchanger 136. The first inlet air stream 110 is also directed through the first three-way heat exchanger 136. The first three-way heat exchanger 136 transfers heat from the first inlet air stream 110 into the conditioner heat transfer fluid 140, thus heating the conditioner heat transfer fluid. The heated conditioner heat transfer fluid 142 exiting the first three-way heat exchanger 136 is channeled back toward the evaporator 118 and the process repeats.

The regenerator sub-system 106 includes a second three-way heat exchanger 144 and a regenerator heat transfer fluid loop 146 that circulates a regenerator heat transfer fluid (e.g., water, a glycol-based fluid, or any combination thereof) to and from the second three-way heat exchanger 144. The regenerator sub-system 106 interfaces with the refrigerant sub-system 102 via the condenser 120. In particular, the condenser 120 is included in the refrigerant loop 126 and the regenerator heat transfer loop 146, and facilitates transfer of heat from the pressurized gas refrigerant 130 in the refrigerant loop 126 into the regenerator heat transfer fluid. The regenerator sub-system 106 may include additional components or other components than those shown and described with reference to FIG. 1. For example, the regenerator sub-system 106 may include one or more pumps (not shown) for circulating the regenerator heat transfer fluid in the loop 146 between the three-way heat exchanger 144 and the condenser 120. Suitable pumps that may be included in the regenerator sub-system 106 include, for example, centrifugal pumps, diaphragm pumps, positive displacement pumps, or any type of pump suitable for transferring liquid. The regenerator sub-system 106 may include additional heat transfer equipment that transfers heat from the atmosphere into the regenerator heat transfer fluid, or vice versa, depending on the operational requirements of the HVAC system 100 and other factors (e.g., a temperature and/or humidity of the first air inlet stream 110).

In an example operation of the regenerator sub-system 106, the regenerator heat transfer fluid in the loop 146 is channeled toward the condenser 120. The regenerator heat transfer fluid is heated in the condenser as heat is transferred from the pressurized gas refrigerant 130 in the loop 126 into the regenerator heat transfer fluid to produce the liquid refrigerant 132. Heated regenerator heat transfer fluid 148 exiting the condenser is channeled toward and enters the second three-way heat exchanger 144. The second inlet air stream 114 is also directed through the second three-way heat exchanger 144. The second three-way heat exchanger 144 transfers heat from the regenerator heat transfer fluid into the second inlet air stream 114, thus cooling the regenerator heat transfer fluid. The heated outlet air stream 116 exiting the second three-way heat exchanger 144 has a greater temperature than the second inlet air stream 114. The cooled regenerator heat transfer fluid 150 exiting the three-way heat exchanger 144 is channeled back toward the condenser 120 and the process repeats.

The HVAC system 100 also includes the liquid desiccant circuit 108 that operates in conjunction with the sub-systems 102-106 to facilitate conditioning the first inlet air stream 110 by latent and sensible cooling. The liquid desiccant circuit 108 includes a liquid desiccant that is channeled between the first and second three-way heat exchangers 136 and 144. Suitable liquid desiccants that may be used in the liquid desiccant circuit 108 include, for example, desiccant salt solutions, such as solutions of water and lithium chloride (LiCl), lithium bromide (LiBr), calcium chloride ($CaCl_2$), or any combination thereof, triethylene glycol, sodium hydroxide, sulfuric acid, and so-called ionic liquid desiccants, or organic salts that are liquid at room temperature and have organic cations and organic or inorganic anions.

The liquid desiccant circuit 108 may include one or more pumps (not shown) for channeling the liquid desiccant between the first three-way heat exchanger 136 and the second three-way heat exchanger 144. Suitable pumps that may be included in the liquid desiccant circuit 108 include, for example, centrifugal pumps, diaphragm pumps, positive displacement pumps, or any type of pump suitable for transferring liquid. The liquid desiccant circuit 108 may include one or more pumps for transferring the liquid desiccant from the second heat exchanger 144 toward the first heat exchanger 136 and one or more pumps for transferring the diluted liquid desiccant 154 from the first heat exchanger 136 toward the second heat exchanger 144.

Concentrated liquid desiccant 152 in the liquid desiccant circuit 108 is channeled toward the first three-way heat exchanger 136 of the conditioner sub-system 104, where the concentrated liquid desiccant 152 removes moisture from the first inlet air stream 110. The concentrated liquid desiccant 152 cooperates with the cooled conditioner heat transfer fluid 140 in the first three-way heat exchanger 136 to absorb heat and moisture from the first inlet air stream 110. The conditioned outlet air stream 112 exiting the first three-way heat exchanger 136 may have a lower humidity and/or a lower temperature than the first inlet air stream 110. The liquid desiccant, having absorbed moisture from the first inlet air stream 110, exits the first three-way heat exchanger 136 as diluted liquid desiccant 154.

The diluted liquid desiccant 154 is channeled toward the second three-way heat exchanger 144 of the regenerator sub-system 106, where the diluted liquid desiccant 154 rejects moisture into the second inlet air stream 114. The diluted liquid desiccant 154 cooperates with the heated regenerator heat transfer fluid 148 in the second three-way heat exchanger 144 to reject heat and moisture into the second inlet air stream 114. The heated outlet air stream 116 exiting the second three-way heat exchanger 144 thus has a greater humidity as well as a higher temperature than the second inlet air stream 114. The liquid desiccant, having rejected moisture into the second inlet air stream 114, exits the regenerator sub-system 106 as concentrated liquid desiccant 152. The concentrated liquid desiccant 152 exiting the second three-way heat exchanger 144 is channeled back toward the first three-way heat exchanger 136, and the process repeats.

The liquid desiccant circuit 108 may also include a desiccant-desiccant heat exchanger 156 for transferring heat from the concentrated liquid desiccant 152 that has exited the second three-way heat exchanger 144 to the diluted liquid desiccant 154 that has exited the first three-way heat exchanger 136. The desiccant-desiccant heat exchanger 156 may facilitate improving the functions of the liquid desiccant in the three-way heat exchangers 136 and 144. For example, the desiccant-desiccant heat exchanger 156 may reduce a temperature of the concentrated liquid desiccant 152 to provide greater cooling and dehumidifying capabilities of the first three-way heat exchanger 136. Additionally and/or alternatively, the desiccant-desiccant heat exchanger 156 may increase a temperature of the diluted liquid desiccant 154 to enable the diluted liquid desiccant 154 to desorb a greater amount of moisture in the second three-way heat exchanger 144. The desiccant-desiccant heat exchanger 156 may be an inline heat exchanger or any suitable heat exchanger that facilitates direct heat transfer between the concentrated liquid desiccant 152 and the diluted liquid desiccant 154. The desiccant-desiccant heat exchanger 156 may alternatively facilitate indirect heat exchange between the concentrated liquid desiccant 152 and the diluted liquid desiccant 154, such as via a vapor compression heat pump. Auxiliary heating and cooling sources (e.g., heating and cooling fluid, such as water) may also be utilized, in addition to or in lieu of the heat exchanger 156, to respectively heat the diluted liquid desiccant 154 and cool the concentrated liquid desiccant 152. The liquid desiccant circuit 108 may include additional components or other components than those shown and described with reference to FIG. 1.

Thus, in the example operating mode of the HVAC system 100, sensible cooling of the first inlet air stream 110 is facilitated by the first three-way heat exchanger 136 of the conditioner sub-system 104, which transfers heat from the inlet air stream 110 into the conditioner heat transfer fluid. The heat removed from the first inlet air stream 110 is then transferred sequentially between the sub-systems 104, 102, and 106 via the evaporator 118 and the condenser 120, and eventually is rejected into the second inlet air stream 114 via the second three-way heat exchanger 144. Latent cooling of the first inlet air stream 110 is also facilitated by the first three-way heat exchanger 136, which removes moisture from the inlet air stream 110 using the concentrated liquid desiccant 152. The moisture absorbed by the diluted liquid desiccant 154 is desorbed in the second three-way heat exchanger 144 into the second inlet air stream 114, which regenerates the concentrated liquid desiccant 152 that is then channeled back toward the first three-way heat exchanger 136.

The HVAC system 100 may operate in alternative operating modes than the example operating mode described above with reference to FIG. 1. The example operating mode of the HVAC system 100 described above may be considered a warm weather operating mode of the HVAC system 100, in which warm, humid air in the first inlet air stream 110 is cooled and dehumidified using the conditioner sub-system 104 and the heat and moisture removed is transferred by the sub-systems 102 and 106 and the liquid desiccant circuit 108 and rejected into the second inlet air stream 114 to produce the heated, humidified outlet air stream 116 that is directed into the warm, humid ambient. In a cold weather operating mode of the HVAC system 100, the operation of the sub-systems 102-106 and the liquid desiccant circuit 108 may be reversed such that the first three-way heat exchanger 136 heats and humidifies cool, dry air in the first inlet air stream 110 to produce warm air with a comfortable humidity level in the outlet air stream 112 that is channeled to a conditioned space. In the cold weather operating mode, the direction of flow of the refrigerant in the loop 126 and the liquid desiccant in the liquid desiccant circuit 108 may be reversed, such that the air treatment sub-systems 104 and 106 switch their respective functions, or intake and outlet vents for the first and second inlet air streams 110 and 114 may be rearranged and/or reconfigured such that the direction of airflow directed through the first and second three-way heat exchangers 136 and 144 is reversed, with the outlet air stream 112 being channeled toward the ambient environment and the outlet air stream 116 being channeled toward the conditioned space. In still other operating modes of the HVAC system 100, depending on the operational requirements and desired setpoint temperature and humidity level within the conditioned space, one of the air treatment sub-system 104 and 106 may be idle or omitted from the HVAC system 100. For example, the air treatment sub-system 106 may be omitted and the refrigerant sub-system 104 may reject or absorb heat from a refrigerant-air heat exchanger 120, depending on the operating mode of the HVAC system 100. Where the regenerator sub-system 106 is omitted or idle, liquid desiccant in the liquid desiccant circuit 108 that is cycled through the first three-way heat exchanger 136 may be regenerated or diluted, depending on the operating mode of the HVAC system 100, using auxiliary regeneration equipment, dilution tanks, or the like.

Still with reference to FIG. 1, the first three-way heat exchanger 136 and the second three-way heat exchanger 144 have substantially the same configuration. In alternative embodiments, the first three-way heat exchanger 136 and the second three-way heat exchanger 144 may have a different configuration. Although the conditioner sub-system 104 and the regenerator sub-system 106 are shown in FIG. 1 to include one three-way heat exchanger 136 and 144, respectively, any suitable number of three-way heat exchangers 136 and 144 may be included in the respective sub-system 104 and 106. The number of three-way heat exchangers 136 included in the conditioner sub-system 104 may be the same or different than the number of three-way heat exchangers 144 included in the regenerator sub-system 106. Where the conditioner sub-system 104 includes multiple three-way heat exchangers 136, the heat exchangers 136 may operate in series, in parallel, or any combination thereof. Where the regenerator sub-system 106 includes multiple three-way heat exchangers 144, the heat exchangers 144 may operate in series, in parallel, or any combination thereof.

Figure 2:
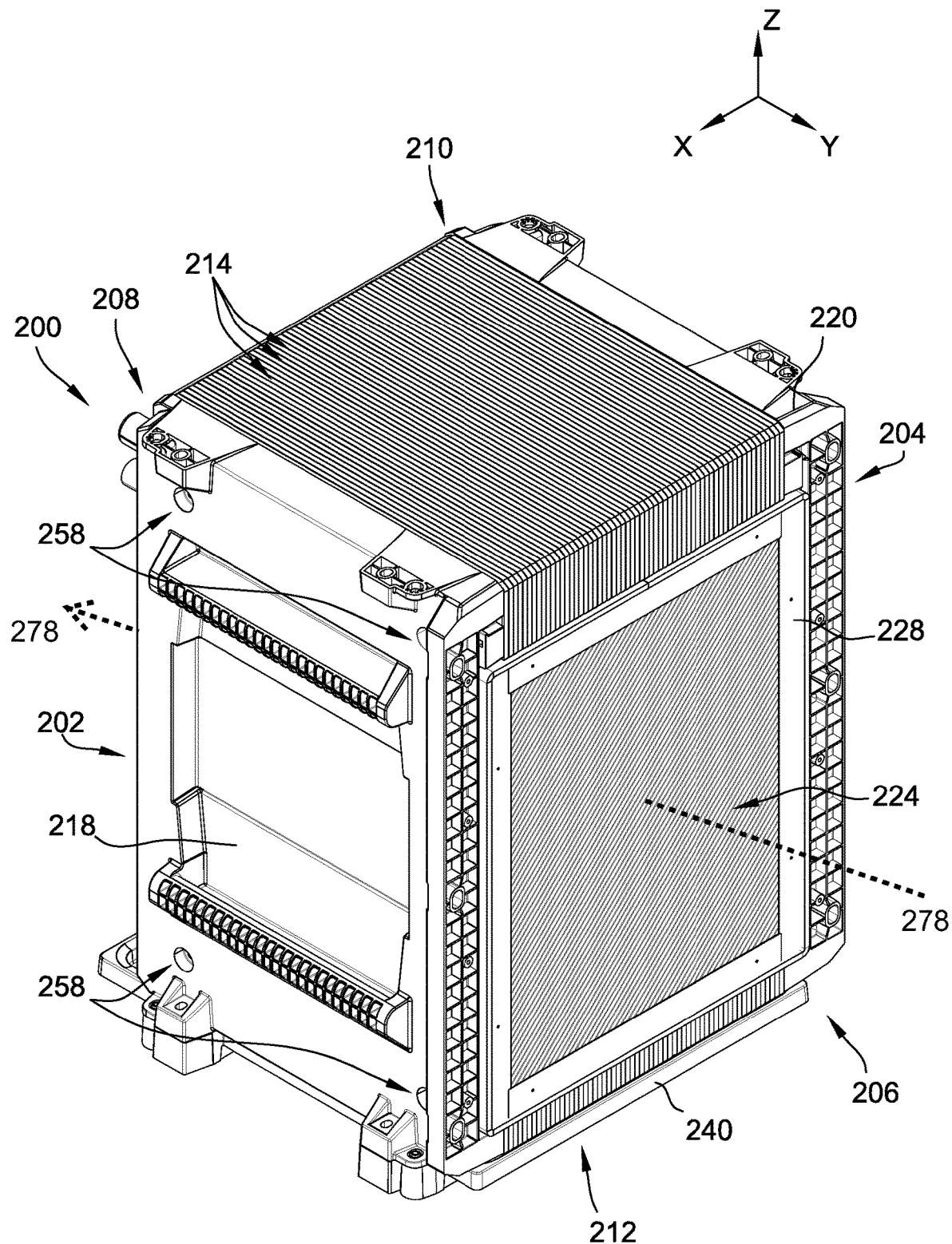
FIG. 2 is a front perspective of a three-way heat exchanger included in the HVAC system of FIG. 1.
Figure 3:
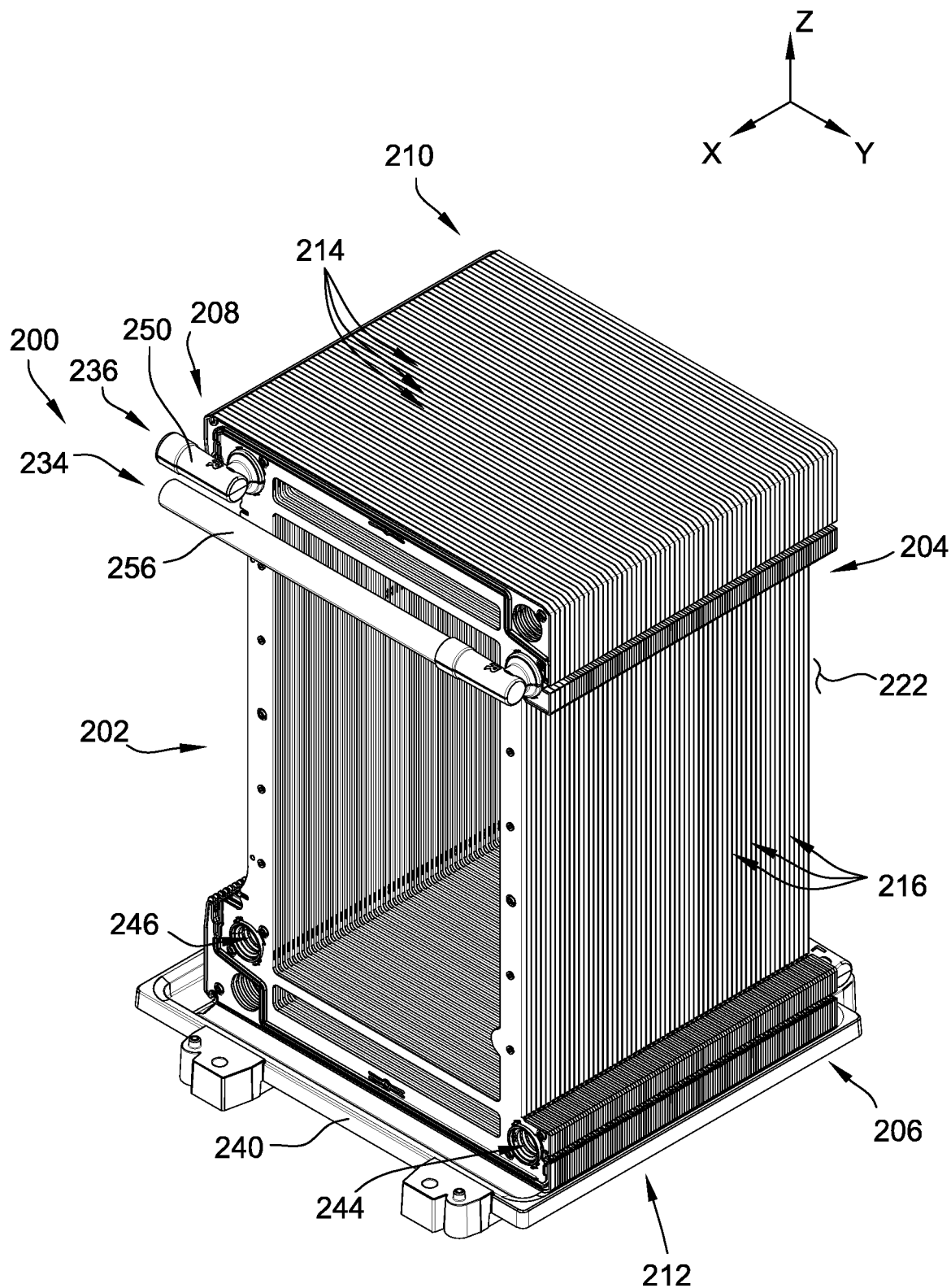
FIG. 3 is a front perspective of the three-way heat exchanger, with various components omitted to show internal components.
Figure 4:
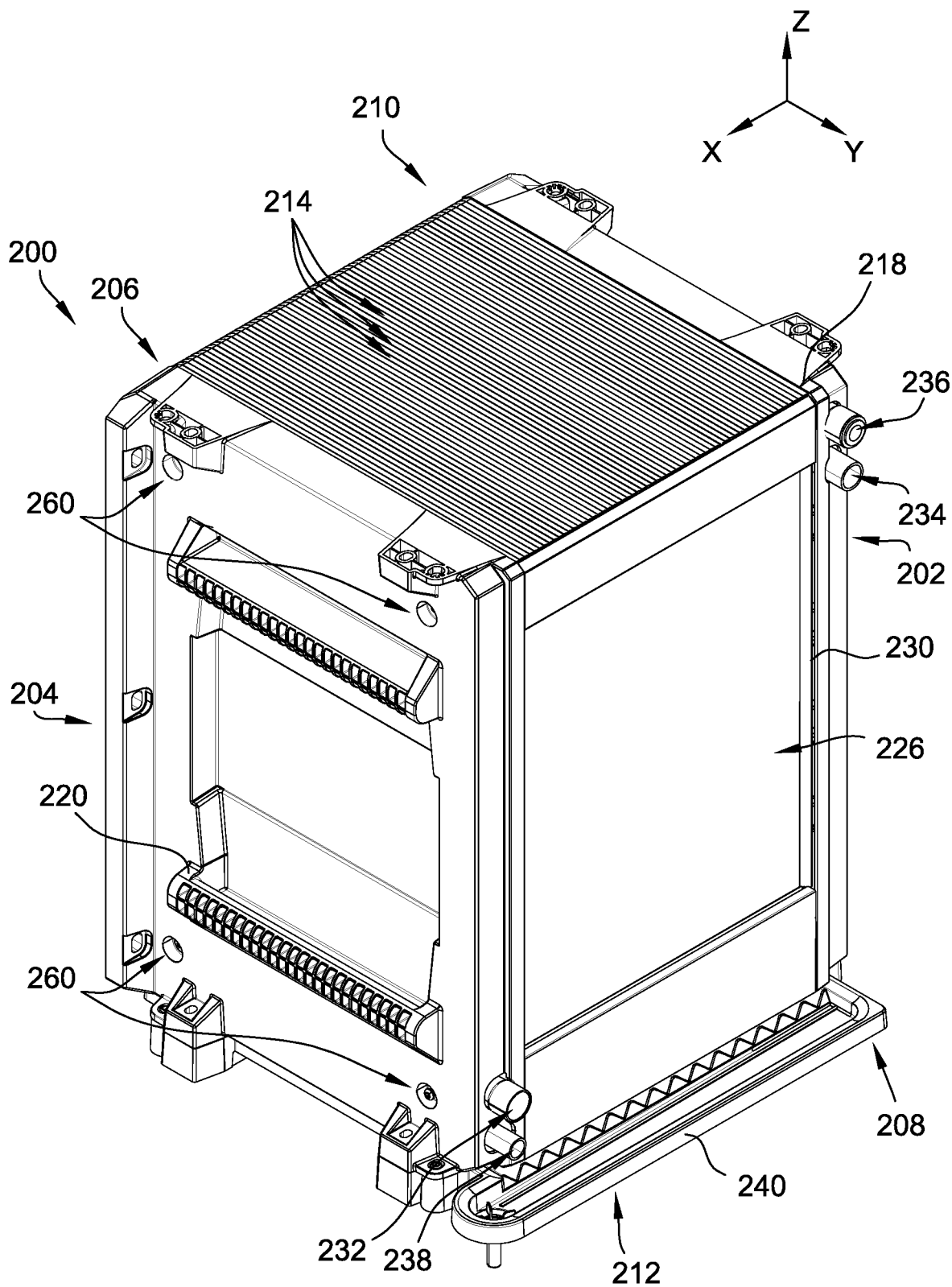
FIG. 4 is a rear perspective of the three-way heat exchanger.
Figure 5:
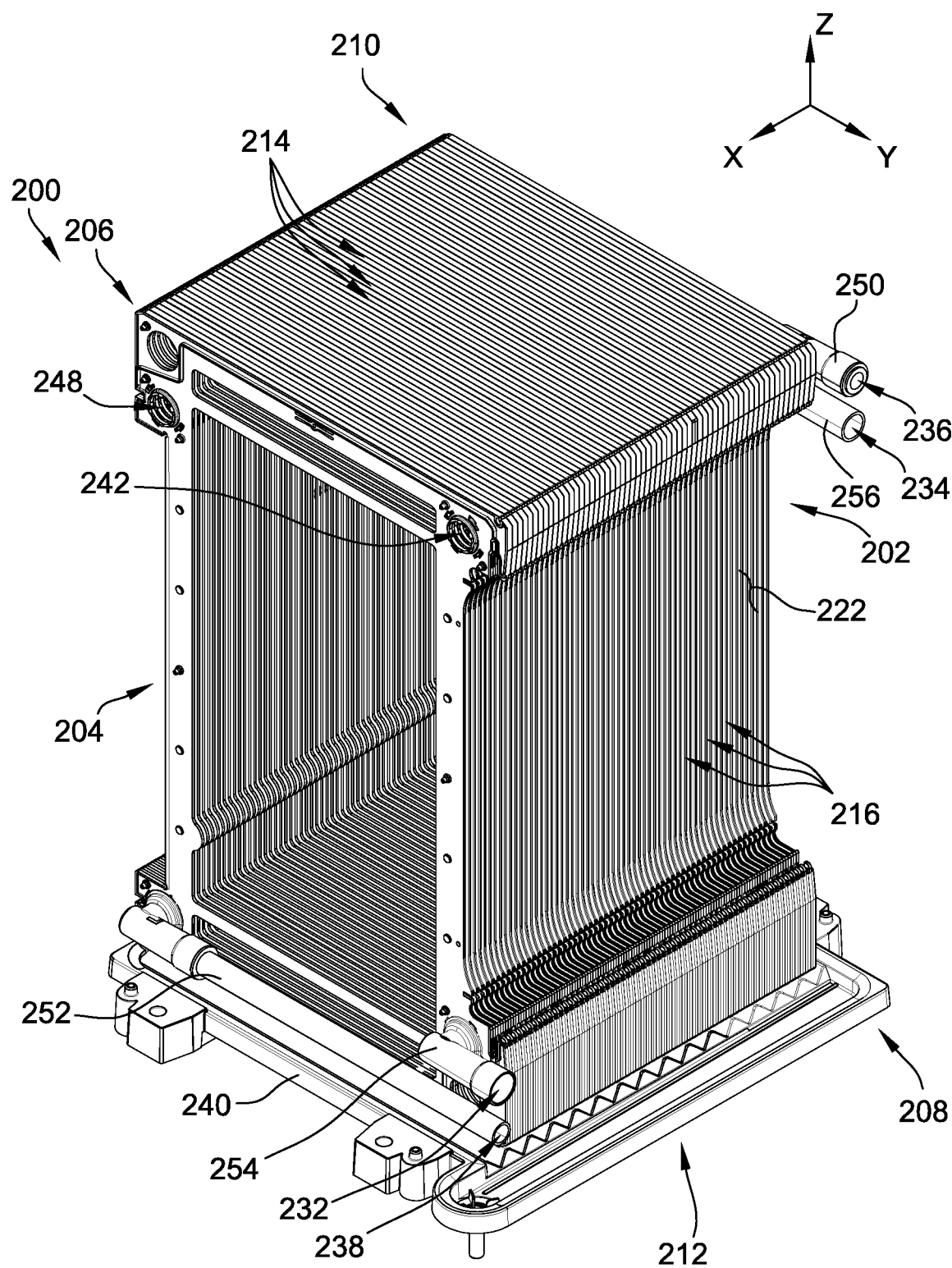
FIG. 5 is a rear perspective of the three-way heat exchanger with various components omitted, similar to FIG. 3.

Referring now to FIGS. 2-5, an example three-way heat exchanger 200 for use in an air treatment sub-system of the HVAC system 100 of FIG. 1 will now be described. The three-way heat exchanger 200 may be implemented as a first three-way heat exchanger 136 in the conditioner sub-system 104 and/or as a second three-way heat exchanger 144 in the regenerator sub-system 106. FIG. 2 is a front perspective of the three-way heat exchanger 200. FIG. 3 is a front perspective of the three-way heat exchanger 200 with various components omitted to show internal components of the three-way heat exchanger 200. FIG. 4 is a rear perspective of the three-way heat exchanger 200. FIG. 5 is a rear perspective of the three-way heat exchanger 200 with various components omitted, similar to FIG. 3.

The three-way heat exchanger 200 has a dimension in the X-axis, Y-axis and Z-axis, respectively. The X-axis, Y-axis and Z-axis are each mutually perpendicular. As described herein with respect to the three-way heat exchanger 200 and components of the heat exchanger 200 when assembled, dimensions in the Z-axis may be referred to as a "height," dimensions in the Y-axis may be referred to as a "length," and dimensions in the X-axis may be referred to as a "width." The three-way heat exchanger 200 defines a lateral direction in the X-axis, a longitudinal direction in the Y-axis, and a vertical direction in the Z-axis. The X-axis may also be referred to herein as a lateral axis, the Y-axis may also be referred to herein as a longitudinal axis, and the Z-axis may also be referred to herein as a vertical axis. The three-way heat exchanger 200 has respectively opposite first and second lateral sides 202 and 204, first and second longitudinal sides 206 and 208, and first and second vertical sides 210 and 212. The first and second lateral sides 202 and 204 are spaced apart in the lateral direction, the first and second longitudinal sides 206 and 208 are spaced apart in the longitudinal direction, and the first and second vertical sides 210 and 212 are spaced apart in the vertical direction. Directional terms are used for solely for description of the three-way heat exchanger 200 and the spatial relation of the components of the heat exchanger. The examples shown and described are not limited to any particular orientation.

The three-way heat exchanger 200 includes a set of panel assemblies 214 (also referred to as multilayer panels) arranged in succession or series in the lateral direction between the first lateral side 202 and the second lateral side 204. The individual panel assemblies 214 will be described in more detail below with reference to FIGS. 7-10. Each panel assembly 214 is in the form of a plate structure that has an internal heat transfer fluid channel through which a heat transfer fluid, such as the conditioner heat transfer fluid in the loop 138 or regenerator heat transfer fluid in the loop 146, flows. Each panel assembly 214 also includes liquid desiccant channels on opposite sides of the heat transfer fluid channel. A liquid desiccant, such as the concentrated liquid desiccant 152 or the diluted liquid desiccant 154 in the liquid desiccant circuit 108, flows through the liquid desiccant channels. Liquid desiccant flowing through the liquid desiccant channels is separated from the heat transfer fluid flowing through the heat transfer fluid channel of the respective panel assembly, and heat is exchanged between the liquid desiccant in the liquid desiccant channels and the heat transfer fluid flowing through the heat transfer fluid channel. Airflow gaps 216, also referred to as air gaps 216, are defined between adjacent panel assemblies 214 in the lateral direction. Each airflow gap 216 extends primarily in the vertical and longitudinal directions.

Any suitable number of panel assemblies 214 may be included in the three-way heat exchanger 200. For example, the three-way heat exchanger 200 may include from 1 to 200 panel assemblies 214, from 1 to 100 panel assemblies 214, from 50 to 200 panel assemblies 214, from 50 to 100 panel assemblies 214, such as one panel assembly, ten panel assemblies 214, twenty panel assemblies 214, thirty panel assemblies 214, forty panel assemblies 214, fifty panel assemblies 214, sixty panel assemblies 214, seventy panel assemblies 214, eighty panel assemblies 214, ninety panel assemblies 214, 100 panel assemblies 214, or greater than 100 panel assemblies 214.

The panel assemblies 214 are supported on a base 240 at the second vertical side 212 of the three-way heat exchanger 200. The panel assemblies 214 extend substantially parallel to one another between the base 240 and the first vertical side 210 of the three-way heat exchanger 200. The panel assemblies 214 may, in an example operation of the three-way heat exchanger 200, deviate from a substantially parallel extent as fluid flows through the panel assemblies 214 and/or as air flows through the air gaps 216 between adjacent panel assemblies 214. The base 240 includes a liquid desiccant reservoir (shown in FIGS. 4 and 5) adjacent the airflow outlet 226 at the second longitudinal side 208 and the second vertical side 212. The liquid desiccant reservoir extends longitudinally outward beyond the panel assemblies 214 and may collect liquid desiccant that is entrained in and subsequently removed from the air stream at the airflow outlet 226 using a liquid desiccant mist trap, described, for example, in U.S. patent application Ser. No. 18/391,384, titled "LIQUID DESICCANT AIR CONDITIONER MODULES HAVING A LIQUID DESICCANT MIST TRAP," filed Dec. 20, 2023, the disclosure of which is incorporated by reference in its entirety.

The three-way heat exchanger 200 includes a first end plate 218 and a second end plate 220 at the first and second lateral sides 202 and 204, respectively. The end plates 218, 220 may also be referred to as end covers or end sheets. The end plates 218 and 220 may provide lateral support for the set of panel assemblies 214 and enclose an interior 222 of the three-way heat exchanger 200 at the first and second lateral sides 202 and 204. The end plates 218 and 220 are omitted from FIGS. 3 and 5 to show the arrangement of the panel assemblies 214, the airflow gaps 216 defined between adjacent panel assemblies 214, and the interior 222 of the three-way heat exchanger 200 in greater detail.

Each end plate 218 and 220 includes alignment apertures 258 and 260, respectively, for receiving clamping assemblies (not shown) used to clamp the panel assemblies 214 together. Example clamping assemblies suitable for use in the three-way heat exchanger 200 are described in U.S. patent application Ser. No. 18/490,984, filed Oct. 20, 2023, the disclosure of which is incorporated by reference in its entirety.

The interior 222 of the three-way heat exchanger 200 may be enclosed at the first and second vertical sides 210 and 212 of the three-way heat exchanger by the set of panel assemblies 214. For example, adjacent panel assemblies 214 may be connected and/or in contact with one another at opposite vertical ends to seal the respective airflow gap 216 defined therebetween at the opposite vertical ends and to enclose the interior 222 of the three-way heat exchanger at the first and second vertical sides 210 and 212. Additionally and/or alternatively, the three-way heat exchanger 200 may include vertical end plates (not shown) to enclose the interior 222 at the first and second vertical sides 210 and 212.

The three-way heat exchanger 200 includes an airflow inlet 224 on the first longitudinal side 206 and an airflow outlet 226 on the second longitudinal side 208. The airflow inlet 224 and the airflow outlet 226 are respectively defined by longitudinal side panels 228 and 230 of the three-way heat exchanger 200. For example, the longitudinal side panels 228 and 230 may include openings in the form of grated or grille openings, shutters, louvers, dampers, or may have any other suitable open configuration to enable airflow to enter into and exit the three-way heat exchanger 200. In some examples, one or both of the longitudinal side panels 228 and 230 may include a filter to filter particulate and/or contaminants from an air stream that is treated by the three-way heat exchanger 200. The airflow inlet 224 and the airflow outlet 226 are in communication with the airflow gaps 216 defined between the adjacent panel assemblies 214, and allow an inlet air stream (e.g., the first or second inlet air stream 110 or 114 in FIG. 1) to flow in an airflow direction (indicated by the arrow 278 in FIG. 2) through the three-way heat exchanger 200 in the longitudinal direction. The airflow direction 278 is in the longitudinal direction in the illustrated example. The airflow direction 278 may be additionally and/or alternatively be in the lateral and/or vertical directions. The longitudinal side panels 228 and 230 are omitted from FIGS. 3 and 5 to show the arrangement of the panel assemblies 214, the airflow gaps 216 defined between adjacent panel assemblies 214, and the interior 222 of the three-way heat exchanger 200 in greater detail.

The three-way heat exchanger 200 also includes heat transfer fluid inlet 232 and outlet 234 and liquid desiccant inlet 236 and outlet 238. Heat transfer fluid (e.g., circulating in one of the heat transfer fluid loops 138 or 146 in FIG. 1)

enters into and exits the three-way heat exchanger 200 via the heat transfer fluid inlet 232 and outlet 234, respectively. Liquid desiccant (e.g., circulating the liquid desiccant circuit 108 in FIG. 1) enters into and exits the three-way heat exchanger 200 via the liquid desiccant inlet 236 and outlet 238, respectively. The locations of the heat transfer fluid inlet 232 and outlet 234 and the liquid desiccant inlet 236 and outlet 238 may vary depending on a desired flow direction of the heat transfer fluid and the liquid desiccant through the panel assemblies 214. The liquid desiccant inlet 236 and the heat transfer fluid outlet 234 may be defined by (e.g., made integral with) the end plate 218 and the liquid desiccant outlet 238 and the heat transfer fluid inlet 232 may be defined by (e.g., made integral with) the end plate 220. Alternatively, the heat transfer fluid inlet 232 and outlet 234 and the liquid desiccant inlet 236 and outlet 238 may each be defined by a conduit (e.g., a pipe, tube, hose, or other suitable fluid conduit) that extends longitudinally through an opening in the respective end plate 218 and 220.

Figure 7:
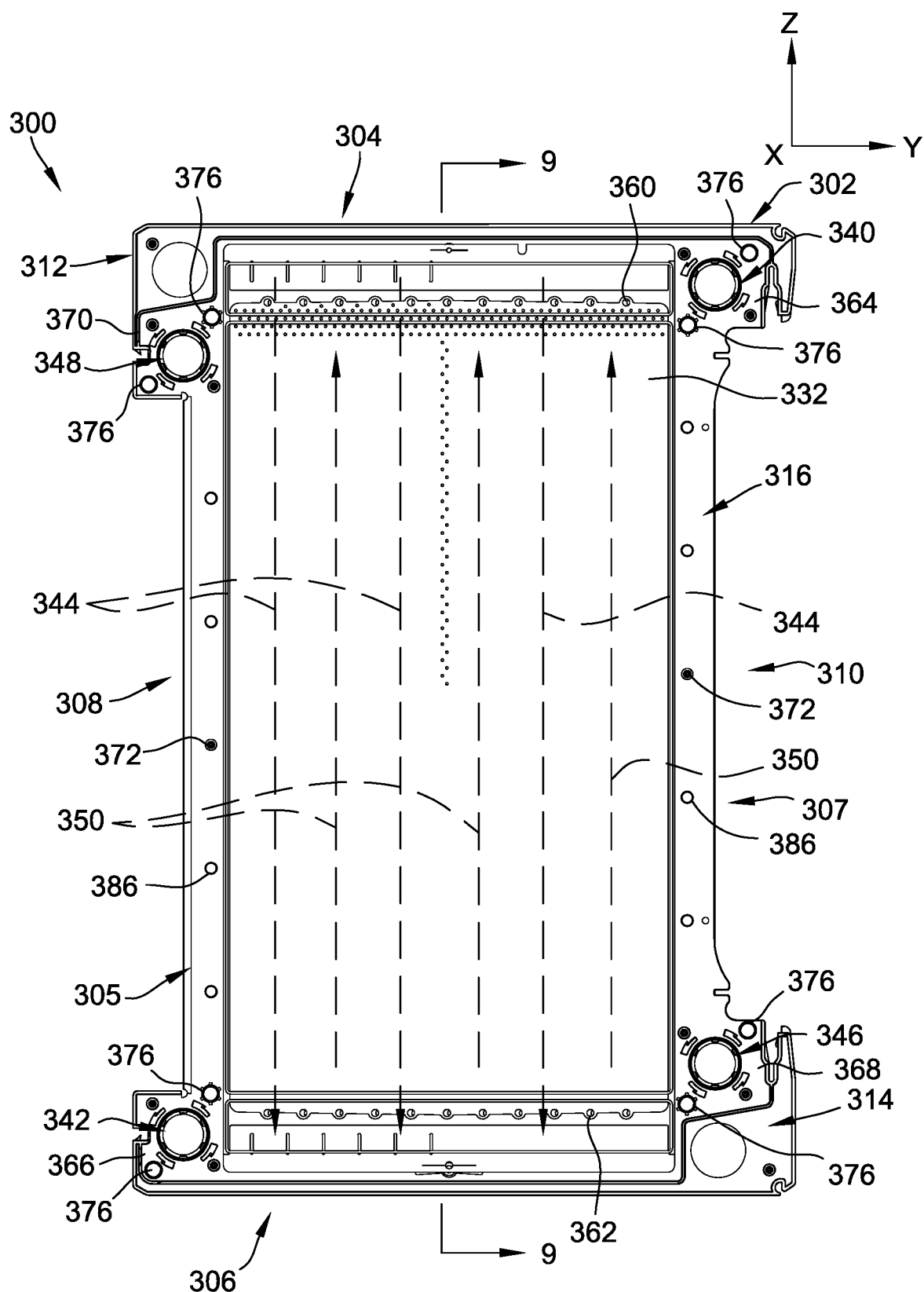
FIG. 7 is a right side elevation of an example panel assembly included in the three-way heat exchanger of FIGS. 2-6.
Figure 8:
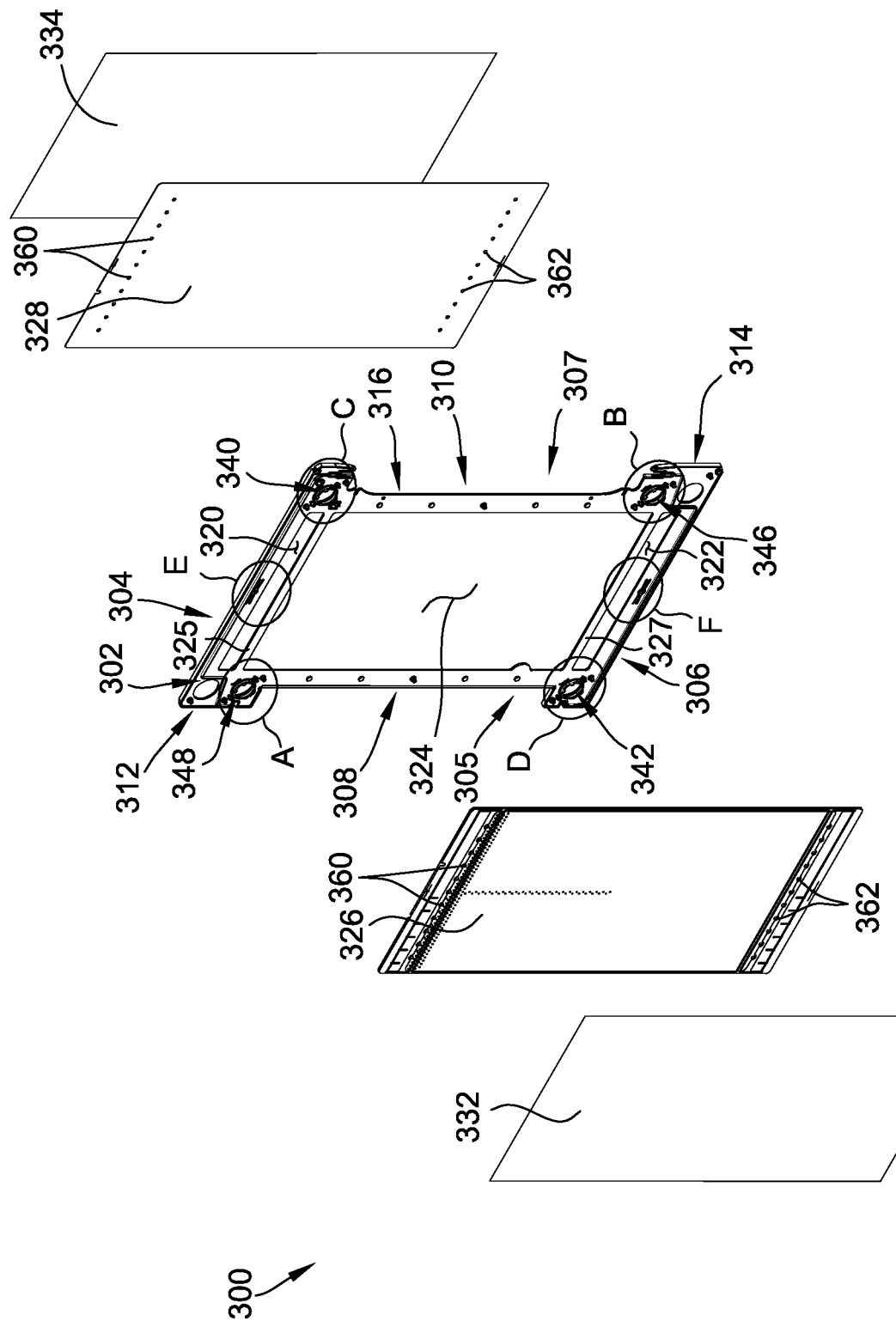
FIG. 8 is an exploded view of the panel assembly of FIG. 7.
Figure 9:
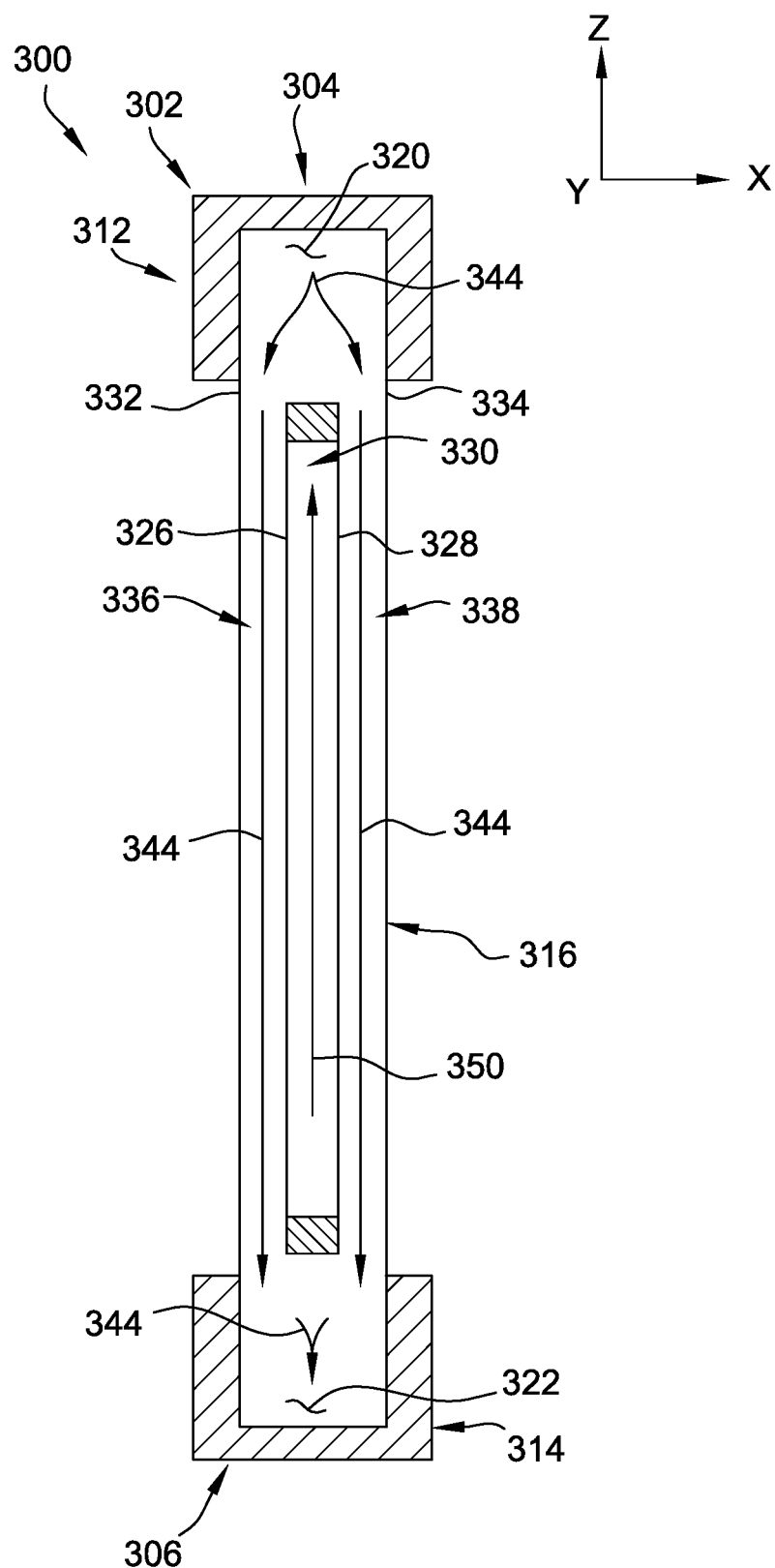
FIG. 9 is a schematic section of the panel assembly taken along section line 9-9 in FIG. 7.

Referring to FIGS. 7-9, an example panel assembly 300 (also referred to as a multilayer panel) suitable for use as the individual panel assemblies 214 will now be described. In the example three-way heat exchanger 200, all the panel assemblies 214 have substantially the same configuration as the panel assembly 300 shown in FIGS. 7-9. The panel assemblies 214 will be referred to as the panel assemblies 300 hereinafter for convenience of description. Some of or all the panel assemblies 214 may include additional components, fewer components, or other components than the panel assembly 300.

FIG. 7 is a right side elevation of the example panel assembly 300. FIG. 8 is an exploded view of the panel assembly 300. FIG. 9 is a schematic section of the panel assembly 300 taken along section line 9-9 in FIG. 7. The spatial relation of components of the panel assembly 300 will be described with respect to the X-axis, Y-axis, and Z-axis, and the lateral direction, longitudinal direction, and vertical direction defined by the three-way heat exchanger 200. The panel assembly 300 will also be described in the orientation when implemented and installed in the three-way heat exchanger 200. Directional terms are used to describe components of the panel assembly 300 solely for convenience of description. The examples shown and described are not limited to any particular orientation.

The panel assembly 300 includes a frame 302 that defines first and second vertical ends 304 and 306, in the Z-axis, first and second lateral faces 305 and 307, in the X-axis, and first and second longitudinal ends 308 and 310, in the Y-axis, of the panel assembly 300. The frame 302 includes opposite first and second header sections 312 and 314 respectively located at the first and second vertical ends 304 and 306. The frame 302 also includes a middle section 316 between the opposite header sections 312 and 314. The header sections 312 and 314 respectively define liquid desiccant header areas 320 and 322. The middle section 316 defines a heat transfer fluid area 324. The liquid desiccant header areas 320 and 322 are separated from the heat transfer fluid area 324 by portions 325, 327 of the frame 302 (or "frame bars" 325, 327) that respectively extend between the heat transfer fluid area 324 and one of the liquid desiccant header areas 320 and 322. The middle section 316 defines a leading edge and a trailing edge of the frame 302. The leading edge extends between the header sections 312, 314 proximate the first longitudinal end 308, and the trailing edge extends between the header sections 312, 314 proximate the second longitudinal end 310. The leading edge and/or the trailing edge may include aerodynamic features that facilitate controlling a pressure drop and/or reducing drag of the air flowing through the airflow gaps 216. Example aerodynamic features are described in U.S. patent application Ser. No. 18/390,941, titled "LIQUID DESICCANT AIR CONDITIONER MODULES HAVING AERODYNAMIC FEATURES," filed Dec. 20, 2023, the disclosure of which is incorporated by reference in its entirety. Each header section 312, 314 of the frame 302 includes complementing airflow restrictor members (not labeled) that cooperate or engage with the airflow restrictor members of the adjacent panel assembly 300 when the heat exchanger 200 is assembled to form airflow restrictors located in the airflow gap 216 between the adjacent panel assemblies at opposite vertical ends. The airflow restrictors are described in U.S. patent application Ser. No. 18/390,948, titled "LIQUID DESICCANT AIR CONDITIONER MODULES HAVING INTERLOCKING PANELS FOR CONTROLLING AIRFLOW," filed Dec. 20, 2023, the disclosure of which is incorporated by reference in its entirety.

The panel assembly 300 also includes first and second plates 326 and 328 disposed on opposite lateral faces of the frame 302, covering the middle section 316 of the frame 302. The first and second plates 326 and 328 be a sheet of material that is, for example, less than 0.5 inch thick, or less than 0.25 inch thick, and the plates 326, 328 may also be referred to as "heat exchange sheets" or "sheets." The first and second plates 326 and 328 may be attached to the frame 302 or may be made integral with the frame 302. Suitable techniques for attaching the plates 326 and 328 to the frame 302 may include, for example, welding (e.g., laser, induction, or radio-frequency welding), adhesive bonding, thermal bonding, or another suitable technique for joining materials together. Additional detail on attaching the plates 326 and 328 to the frame 302 is described in U.S. Pat. No. 11,022,330, issued on Jun. 1, 2021, and U.S. Pat. No. 10,921,001, issued on Feb. 16, 2021, the disclosures of each of which are hereby incorporated herein by reference in their entirety. Example systems and methods for attaching the plates 326 and 328 to the frame 302 are described further below with reference to FIGS. 12-16.

The frame 302 and the plates 326 and 328 may be made from dissimilar but compatible materials for welding together. For example, the frame 302 and the plates 326 and 328 may each be made from the same or different thermoplastic or polymer materials. The material used for the frame 302 and the plates 326 and 328 may also be selected based on its compatibility with the liquid desiccant used in the three-way heat exchanger 200. Suitable polymer materials for the frame 302 and the plates 326 and 328 include, for example, polyolefins (e.g., polypropylene and/or polyethylene), acrylonitrile butadiene styrene (ABS), and combinations thereof. The frame 302 and the plates 326, 328 may be made from the same or compatible materials to enable attaching (e.g., welding) the frame and the plates. The frame 302 and/or the plates 326 and 328 may include additives that improve properties such as laser-absorbing and conductivity properties, as well as the strength and/or stiffness of the plates 326 and 328. For example, the frame 302 and/or the plates 326, 328 may include carbon black in a suitable amount to facilitate absorbing laser energy and laser welding the plates and the frame. Additionally, and/or alternatively, the frame 302 and/or the plates 326, 328 may include conductive fiber additives to facilitate radio-frequency welding. In other examples, the frame 302 and the plates 326 and 328 may be made from any other suitable materials that enable the three-way heat exchanger 200 to function as described.

The sheets or plates 326 and 328 envelop and seal the heat transfer fluid area 324 of the frame, defining a heat transfer fluid channel 330 of the panel assembly 300 between the plates 326 and 328 (see FIG. 9). As described below, in an example operation of the three-way heat exchanger 200, heat transfer fluid flows between the plates 326 and 328 through the heat transfer fluid channel 330 and liquid desiccant flows over an outer surface of the plates 326 and 328, opposite the heat transfer fluid channel 330. The plates 326 and 328 isolate the liquid desiccant from the heat transfer fluid in the channel 330, and allow heat to transfer between the liquid desiccant and the heat transfer fluid. The plates 326 and 328 may extend over one or both of liquid desiccant header areas 320 and 322 and define openings (e.g., apertures 360) that align with the one or both of the liquid desiccant header areas 320 and 322 to enable liquid desiccant to flow therethrough. In the example panel assembly 300, each of the plates 326 and 328 includes a series of apertures 360 located adjacent the liquid desiccant header 320 and a series of apertures 362 located adjacent the liquid desiccant header area 322. Liquid desiccant may flow through the apertures 360 and 362 of each plate 326 and 328 to enter and/or exit the liquid desiccant header area 320 and 322, respectively.

A netting or mesh (not shown) may be disposed in the heat transfer fluid channel 330 to maintain a width of the heat transfer fluid channel under negative pressure. The netting or mesh may also facilitate more constant flow rates of the heat transfer fluid through the channel 330. The netting or mesh may also facilitate improving flow distribution of the heat transfer fluid between the panel assemblies 300 in the three-way heat exchanger 200. The netting or mesh may also provide turbulation of the heat transfer fluid to increase heat transfer with the liquid desiccant flowing over the outer surfaces of the sheets or plates 326 and 328. A wide variety of materials may be used for the netting or mesh. For example, the netting or mesh may include the same polymer material as the plates (e.g., polyolefins, ABS, or combinations thereof). Alternatively, a flow guide (not shown) may be disposed in the heat transfer fluid channel 330. Example flow guides are described in U.S. patent application Ser. No. 18/585,344, titled "THREE-WAY HEAT EXCHANGE MODULE WITH CONTROLLED FLUID FLOW," filed Feb. 23, 2024, the disclosure of which is incorporated by reference in its entirety.

Referring again to FIGS. 7-9, the panel assembly 300 also includes membranes 332 and 334 disposed on the opposite lateral faces 305 and 307 of the frame 302. In other examples, only one of the membranes 332 or 334 may be included in the panel assembly 300. The membranes 332 and 334 cover the outer surfaces of the sheets or plates 326 and 328. As shown in FIG. 9, liquid desiccant channels 336 and 338 are respectively defined between the membrane 332 and the plate 326 and the membrane 334 and the plate 328. The membranes 332 and 334 also envelop and seal the liquid desiccant header areas 320 and 322. Each liquid desiccant channel 336 and 338 connects the liquid desiccant header areas 320 and 322 in fluid communication. As described below, in an example operation of the three-way heat exchanger 200, liquid desiccant flows through one of the liquid desiccant header areas 320 or 322, into the liquid desiccant channels 336 and 338, over the outer surfaces of the plates 326 and 328 and behind the membranes 332 and 334, and finally into the other one of the liquid desiccant header areas 320 or 322. The plates 326 and 328 limit contact between the liquid desiccant flowing in the liquid desiccant channels 336 and 338 and heat transfer fluid flowing through the heat transfer fluid channel 330, and enable heat to transfer therebetween. In examples where only one of the membranes 332 or 334 is included in the panel assembly 300, only one liquid desiccant channel 336 or 338 may be defined between the membrane 332 or 334 and the plate 326 or 328. In these examples, the plate 326 or 328 on the lateral face 305 or 307 opposite the liquid desiccant channel 336 or 338 may envelop and seal the liquid desiccant header areas 320 and 322 and restrict flow of liquid desiccant opposite the liquid desiccant channel 336 or 338.

The membranes 332 and 334 are attached to one of the lateral faces 305 and 307, respectively, of the frame 302 to envelop and seal the liquid desiccant header areas 320 and 322. The membranes 332 and 334 may additionally and/or alternatively be attached to the outer surface of the respective sheet or plate 326 and 328, which may facilitate maintaining a width of the liquid desiccant channels 336 and 338 and/or limiting a propensity of the membranes 332 and 334 to bulge outward when liquid desiccant flows through the liquid desiccant channels 336 and 338. The membranes 332 and 334 may be attached to the lateral faces 305 and 307 of the frame 302 and/or the outer surfaces of the plates 326 and 328 using any suitable technique, such as adhesive bonding, heat sealing, or welding, for example. The membranes 332 and 334 may be respectively attached to the plates 326 and 328 directly by heat sealing or welding where compatible materials (e.g., polyolefins) are used for the membranes 332 and 334 and the respective plates 326 and 328. An outer bonding layer (not shown) may be applied over the outer surfaces of the plates 326 and 328 to improve the quality or ease of forming the heat seals or welds with the respective membranes 332 and 334. The outer surfaces of the plates 326 and 328 may include raised patterns or dot features (not shown) to which the membranes 332 and 334 are adhered, heat sealed, or otherwise attached. The raised patterns may be formed on the frame 302 and/or plates 326 and 328 by thermoforming, embossing, or other suitable techniques. Attaching the membranes 332 and 334 to the dot features or raised patterns may provide an additional advantage of facilitating uniform distribution of the liquid desiccant across the liquid desiccant channels 336 and 338 in the longitudinal direction and reducing stresses that can lead to warping of the plates 326 and 328. Warping of the plates 326 and 328 may degrade the ability to transfer heat and moisture between the heat transfer fluid, the liquid desiccant, and air that flows across the membranes 332 and 334 in an example operation of the three-way heat exchanger 200. Additional detail on attaching the membranes 332 and 334 to the frame 302 and the respective plates 326 and 328 is described in U.S. Pat. No. 11,022,330, issued on Jun. 1, 2021, and U.S. Pat. No. 10,921,001, issued on Feb. 16, 2021, the disclosures of each of which are hereby incorporated herein by reference in their entirety. Example systems and methods for attaching the membranes 332 and 334 to the frame 302 and the respective sheets or plates 326 and 328 are described further below with reference to FIGS. 12-16.

The membranes 332 and 334 are made of a vapor-permeable material that permits transfer of water vapor therethrough to enable liquid desiccant flowing in the liquid desiccant channels 336 and 338 to absorb moisture from and desorb moisture into air flowing across the membranes 332 and 334. In some examples, the membranes 332 and 334 may each be made from a polypropylene material or other suitable vapor-permeable polymer material. The vapor-permeable material used for the membranes 332 and 334 may be microporous (e.g., having a pore size less than 0.5 micrometers ($\mu$m)). Examples of suitable microporous membranes are disclosed in U.S. Pat. No. 9,101,874, issued on Aug. 11, 2015, the disclosure of which is hereby incorporated by reference herein in its entirety. By way of example, suitable commercially available membrane include the EZ2090 polypropylene, microporous membrane from Celgard. Microporous membranes 332 and 334 may have 40-80% open area, pore sizes of less than 0.5 µm, and a thickness of less than 100 µm. Some example microporous membranes may have greater than 80% open area. One suitable membrane is approximately 65% open area and has a thickness of approximate 20 µm. This type of membrane is structurally very uniform in pore size and is thin enough to not create a significant thermal barrier. Other possible membranes include membranes from 3M, Lydall, and other manufacturers. The membranes 332 and 334 may include any suitable vapor-permeable material that permits water transfer therethrough to enable the liquid desiccant in the liquid desiccant channels 336 and 338 to absorb moisture from or desorb moisture into air flowing over the membranes 332 and 334. The membranes 332 and 334 may be made from a translucent material, such as a translucent thermoplastic or polymer (e.g., polypropylene), that has a suitable laser transmissivity to enable laser welding the frame 302 and the plate 326, 328 when the respective membrane 332, 334 is attached (e.g., heat sealed) to the plate, without forming a weld between the membrane and plate.

The frame 302 defines a liquid desiccant inlet port 340 that feeds liquid desiccant into the liquid desiccant header area 320 and a liquid desiccant outlet port 342 that receives liquid desiccant from the liquid desiccant header area 322. The liquid desiccant inlet port 340 is defined in a first corner flange 364 of the frame 302. The first corner flange 364 of the frame 302 is part of the first header section 312 and is located adjacent to the liquid desiccant header area 320 at the first vertical end 304 and the second longitudinal end 310 of the panel assembly 300. The liquid desiccant outlet port 342 is defined in a second corner flange 366 of the frame 302. The second corner flange 366 is part of the second header section 314, and is located adjacent to the liquid desiccant header area 322 at the second vertical end 306 and the first longitudinal end 308 of the panel assembly 300. Thus, the first and second corner flanges 364 and 366, and the liquid desiccant inlet and outlet ports 340 and 342 respectively defined therein, are located on opposite longitudinal and vertical ends of the panel assembly 300.

As represented by the flow lines 344 in FIGS. 7 and 9, in an example operation of the three-way heat exchanger 200, liquid desiccant is supplied into the liquid desiccant header area 320 of the panel assembly 300 via the liquid desiccant inlet port 340, flows through each of the liquid desiccant channels 336 and 338 and into the liquid desiccant header area 322, and exits the panel assembly 300 via the liquid desiccant outlet port 342. In the illustrated example, the liquid desiccant flows vertically downward in the desiccant channels 336, 338. The liquid desiccant may have alternative flow directions. The flow direction(s) of the liquid desiccant in the channels 336, 338 may vary depending, for example, on the orientation of the panel assemblies 300 in the heat exchanger 200, location of the liquid desiccant inlet and outlet ports 340, 342, and/or to which liquid desiccant header area 320, 322 the liquid desiccant is supplied and from which header area the liquid desiccant exits.

The frame 302 also defines a heat transfer fluid inlet port 346 that feeds heat transfer fluid into the heat transfer fluid channel 330 and a heat transfer fluid outlet port 348 that receives heat transfer fluid from the heat transfer fluid channel 330. The heat transfer fluid inlet port 346 is defined in a third corner flange 368 of the frame 302. The third corner flange 368 of the frame 302 is part of the second header section 314 and the middle section 316. The third corner flange 368 is located adjacent to heat transfer fluid channel 330, at the second longitudinal end 310 and proximate to the second vertical end 306 of the panel assembly 300. The heat transfer fluid outlet port 348 is defined in a fourth corner flange 370 of the frame 302. The fourth corner flange 370 is part of the first header section 312 and the middle section 316. The fourth corner flange 370 is located adjacent to the heat transfer fluid channel 330, at the first longitudinal end 308 and proximate to the first vertical end 304 of the panel assembly 300. Thus, the third and fourth corner flanges 368 and 370, and the heat transfer fluid inlet and outlet ports 346 and 348 respectively defined therein, are located on opposite longitudinal and vertical ends of the panel assembly 300. Additionally, the first and fourth corner flanges 364 and 370, and the liquid desiccant inlet port 340 and the heat transfer fluid outlet port 348 respectively defined therein, are both located proximate to the first vertical end 304, on opposite longitudinal ends of the panel assembly. The second and third corner flanges 366 and 368, and the liquid desiccant outlet port 342 and the heat transfer fluid inlet port 346 respectively defined therein, are both located proximate to the second vertical end 306, on opposite longitudinal ends of the panel assembly.

As represented by the flow lines 350 in FIGS. 7 and 9, in an example operation of the three-way heat exchanger 200, heat transfer fluid is supplied into the heat transfer fluid channel 330 of the panel assembly 300 via the heat transfer fluid inlet port 346, flows therethrough, and exits the panel assembly 300 via the heat transfer fluid outlet port 348. In the illustrated example, the heat transfer fluid flows vertically upward in the channel 330. The heat transfer fluid may have alternative flow directions. The flow direction(s) of the heat transfer fluid in the channel 330 may vary depending, for example, on the orientation of the panel assemblies 300 in the heat exchanger 200, location of the heat transfer fluid inlet and outlet ports 346, 348, and/or through which port 346, 348 the heat transfer fluid enters the channel 330 and through which port the heat transfer fluid exits the channel 330.

Figure 10A:
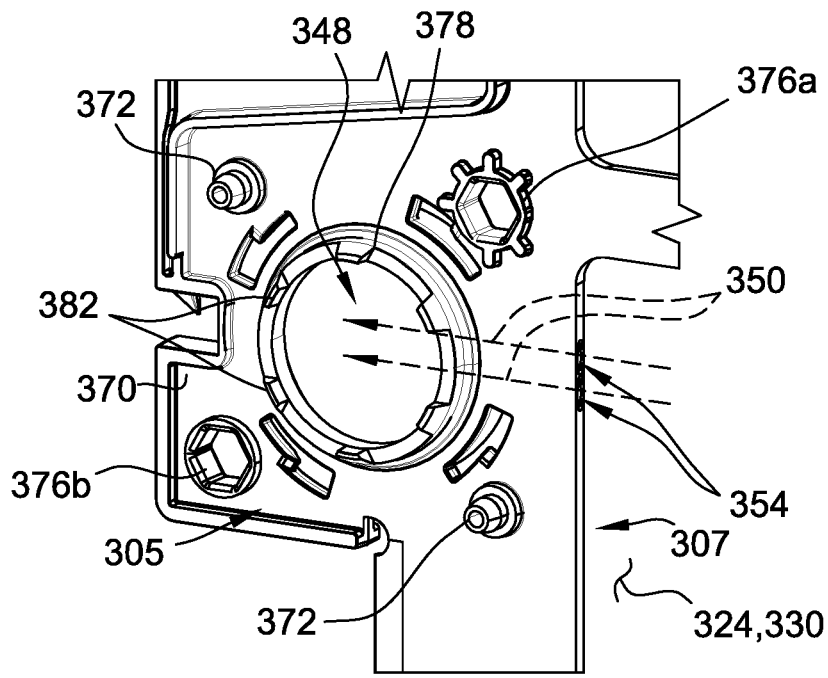
FIGS. 10A-10F are enlarged views of the sections A, B, C, D, E, and F, respectively, shown in FIG. 8.
Figure 10B:
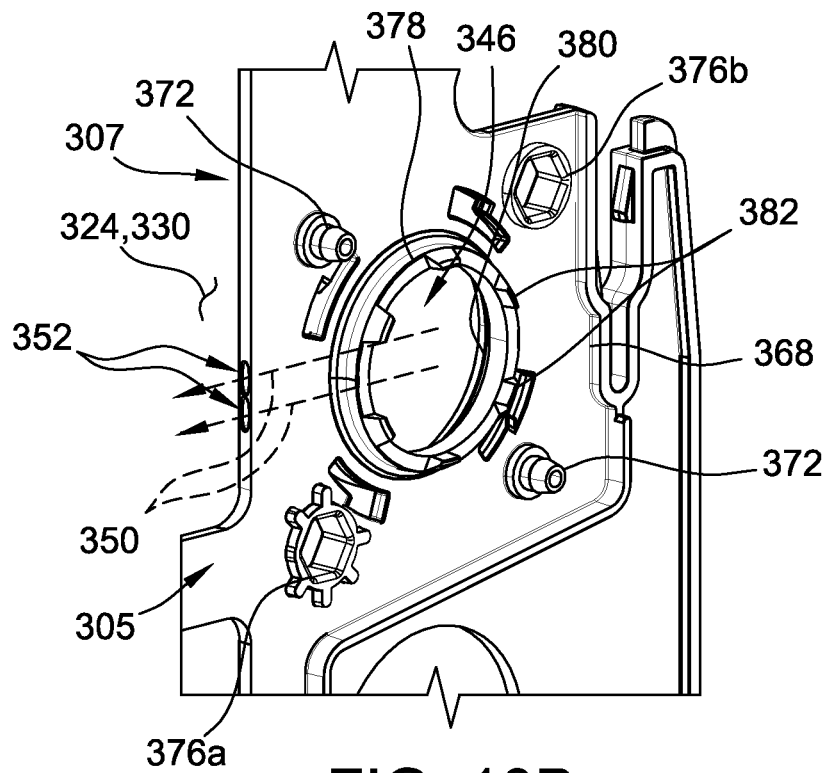

FIGS. 10A-10D are enlarged views of the sections A, B, C, D, respectively, of the frame 302 shown in FIG. 8, and depict the corner flanges 364-370 in greater detail. In particular, FIGS. 10A-10D show microchannels or apertures that provide fluid connection between the ports 340, 342, 346, and 348 and the respective fluid areas defined in the panel assembly 300. As shown in FIGS. 10A and 10B, the heat transfer fluid inlet port 346 is connected to the heat transfer fluid area 324 by apertures 352 (FIG. 10B) and the heat transfer fluid outlet port 348 is connected to the heat transfer fluid area 324 by apertures 354 (FIG. 10A). The heat transfer fluid area 324 defines the heat transfer fluid channel 330 when sealed on the opposite lateral faces 305 and 307 of the frame 302 by the plates 326 and 328. As indicated by the flow lines 350 in FIGS. 10A and 10B, heat transfer fluid enters the heat transfer fluid channel 330 from the inlet port 346 via the apertures 352 and exits the channel 330 into the outlet port 348 via the apertures 354.

Figure 10C:
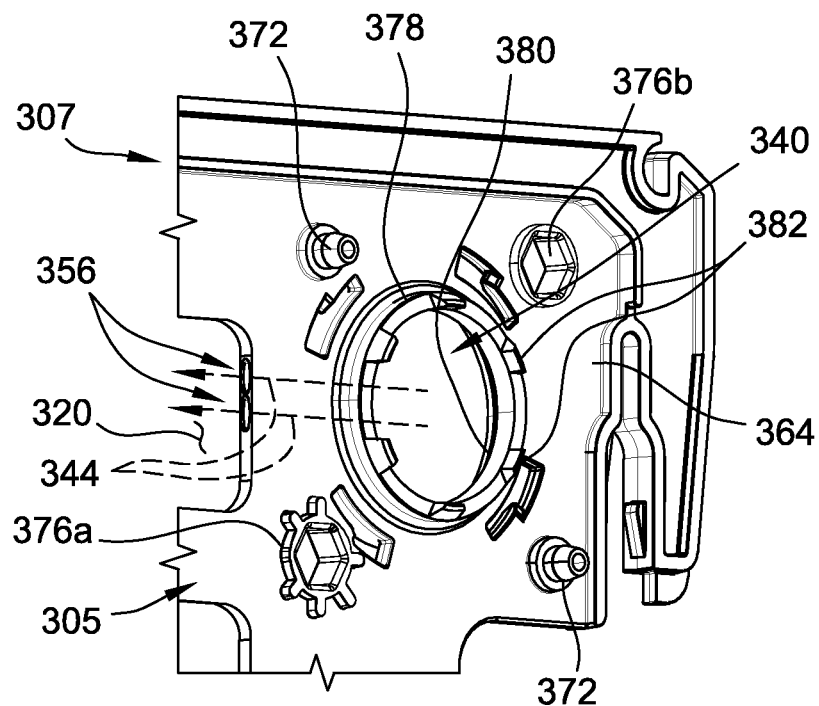
Figure 10D:
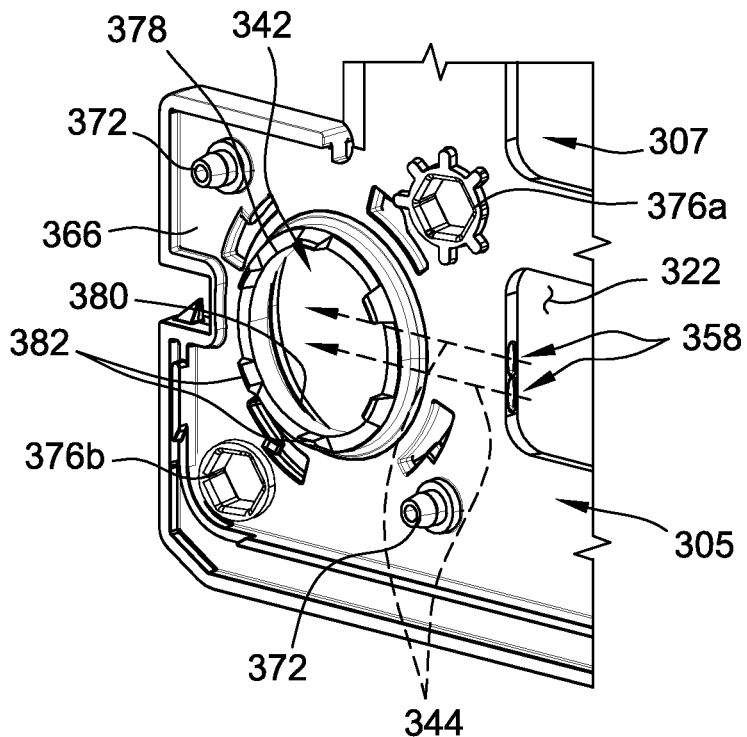

As shown in FIGS. 10C and 10D, the liquid desiccant inlet port 340 is connected to the first liquid desiccant header area 320 by apertures 356 (FIG. 10C) and the liquid desiccant outlet port 342 is connected to the second liquid desiccant header area 322 by apertures 358 (FIG. 10D). As indicated by the flow lines 344 in FIGS. 10C and 10D, liquid desiccant enters the first liquid desiccant header area 320 from the inlet port 340 via the apertures 356, flows into and through the liquid desiccant channels 336 and 338 (FIG. 9), into the second liquid desiccant header area 322, and exits the header area 322 into the outlet port 342 via the apertures 358. In the illustrated example of FIGS. 10A-10D, each of the apertures 352-358 include two apertures. Any suitable number of apertures may be used for the apertures 352-358. In some examples, a greater number of apertures may be used for some of the apertures 352-358 than the other apertures 352-358. The number, size, and/or shape of the apertures 352-358 may be the same or different. The number of apertures, as well as the size and shape, used for each of the apertures 352-358 may also vary between panel assemblies 300.

FIGS. 10A-10D also show example features of the panel assembly 300 that may facilitate connecting adjacent panel assemblies 300 together when installed in the three-way heat exchanger 200. For example, when panel assemblies 300 are arranged in series and installed in the heat exchanger 200, the corner flanges 364-370 of the frames 302 of adjacent panel assemblies 300 may be connected. As shown, each corner flange 364-370 includes one or more snap fittings 372. The snap fittings 372 extend in the lateral direction from the first lateral face 305 of the frame 302, and a corresponding bore 374 (shown in FIG. 6) depends into the second lateral face 307 at the location laterally opposite the snap fitting 372. Each corner flange 364-370 includes two snap fittings 372 and corresponding bores 374 in the illustrated example. In other examples, more or fewer snap fittings 372 and corresponding bores 374 may be included at the corner flanges 364-370. The corner flanges 364-370 may include the same or a different number of snap fittings 372 and corresponding bores 374. Suitably, a corresponding bore 374 is included for each snap fitting 372 in each corner flange 364-370. When the panel assemblies 300 are arranged in series and installed in the heat exchanger 200, each snap fitting 372 of the corner flanges 364-370 of the frame 302 of one of the panel assemblies 300 is received by one of the corresponding bores 374 of the corner flanges 364-370 of the frame 302 of a laterally adjacent panel assembly 300 to directly connect adjacent panel assemblies 300.

Each corner flange 364-370 also includes one or more alignment holes 376 extending therethrough in the lateral direction. In the illustrated embodiment, the corner flanges 364-370 each include two alignment holes 376, labeled in FIGS. 10A-D as a first alignment hole 376a and a second alignment hole 376b. The first alignment holes 376a of each corner flange 364-370 are located longitudinally inboard of the second alignment holes 376b and adjacent to respective corners of the heat transfer fluid area 324. In other examples, more or fewer alignment holes 376 may be included at the corner flanges 364-370. The corner flanges 364-370 may include the same or a different number of alignment holes 376. When the panel assemblies are arranged in series and installed in the heat exchanger 200, the alignment holes 376 of the corner flanges 364-370 of the frames 302 of the panel assemblies 300 receive a corresponding clamping assembly (not shown) used to clamp the panel assemblies 300 together. The first alignment holes 376a of the panel assemblies 300 correspond to one of the alignment apertures 258 of the first end plate 218 and one of the alignment apertures 260 of the second end plate 220 (shown in FIGS. 2 and 4). The second alignment holes 376b receive a corresponding clamping assembly (not shown). The second alignment holes 376b do not correspond to alignment apertures 258 and 260 in the end plates 218 and 220, such that the clamping assemblies received by the second alignment holes 376b extend through the panel assemblies 300 but not the end plates 218 and 220.

Still referring to FIGS. 10A-10D, each of the corner flanges 364-370 includes flange collar 378 circumscribing the respective fluid port 340, 342, 346, 348 defined in the corner flange. The flange collars 378 extend in the lateral direction from the first lateral face 305 of the frame 302. Each corner flange 364-370 also includes a corresponding grooved mouth 380 that depends into the second lateral face 307 and circumscribes the respective fluid port 340, 342, 346, 348 at the location laterally opposite the flange collar 378. When the panel assemblies 300 are arranged in series and installed in the heat exchanger 200, each flange collar 378 of the corner flanges 364-370 of the frame 302 of one of the panel assemblies 300 is received by one of the corresponding grooved mouths 380 of the corner flanges 364-370 of the frame 302 of a laterally adjacent panel assembly 300 to directly connect adjacent panel assemblies 300. The flange collars 378 each include a set of piloting teeth 382 that facilitate aligning the flange collars 378 with the corresponding grooved mouths 380 and inserting the flange collars 378 therein. The piloting teeth 382 may include a piloting feature (e.g., a chamfer) for easier insertion of the teeth and the flange collar 378 into the corresponding grooved mouth 380. Elastomeric seals (not shown), such as an O-ring, may be seated within each of the grooved mouths 380 and to create a fluid-tight seal between the adjacent panel assemblies 300 at the adjacent fluid ports 340, 342, 346, 348 when the flange collars 378 are inserted into the grooved mouths 380.

Figure 10E:
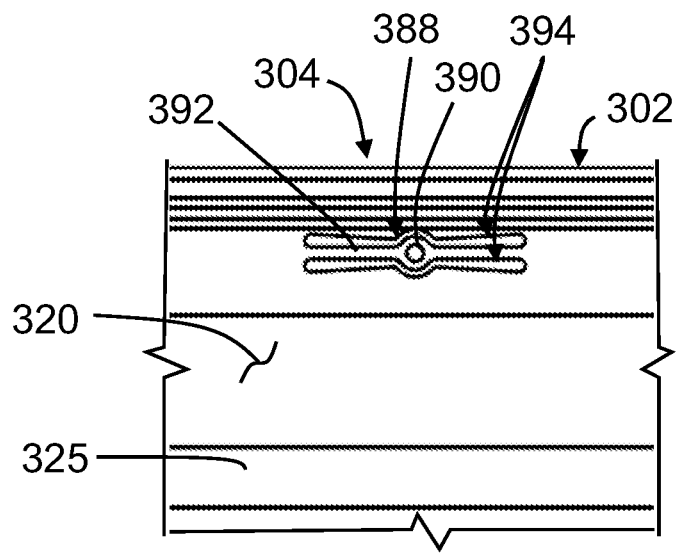
Figure 10F:
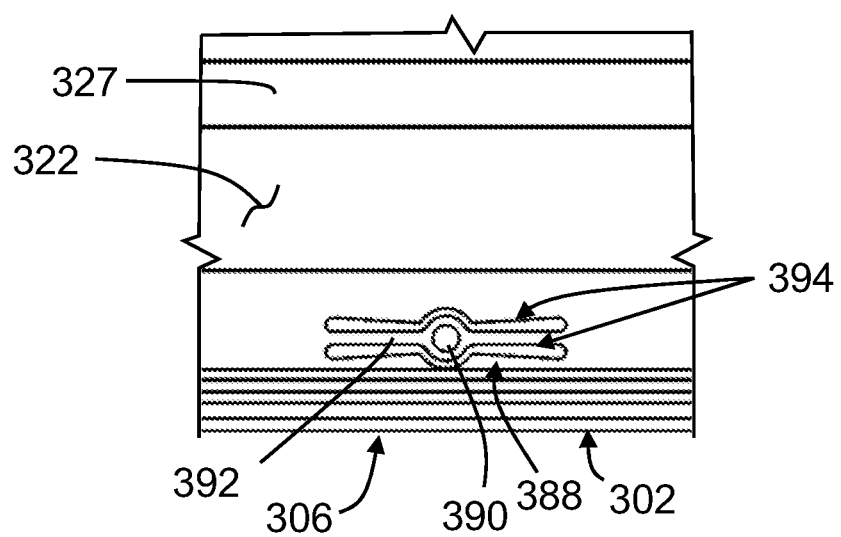
Figure 12:
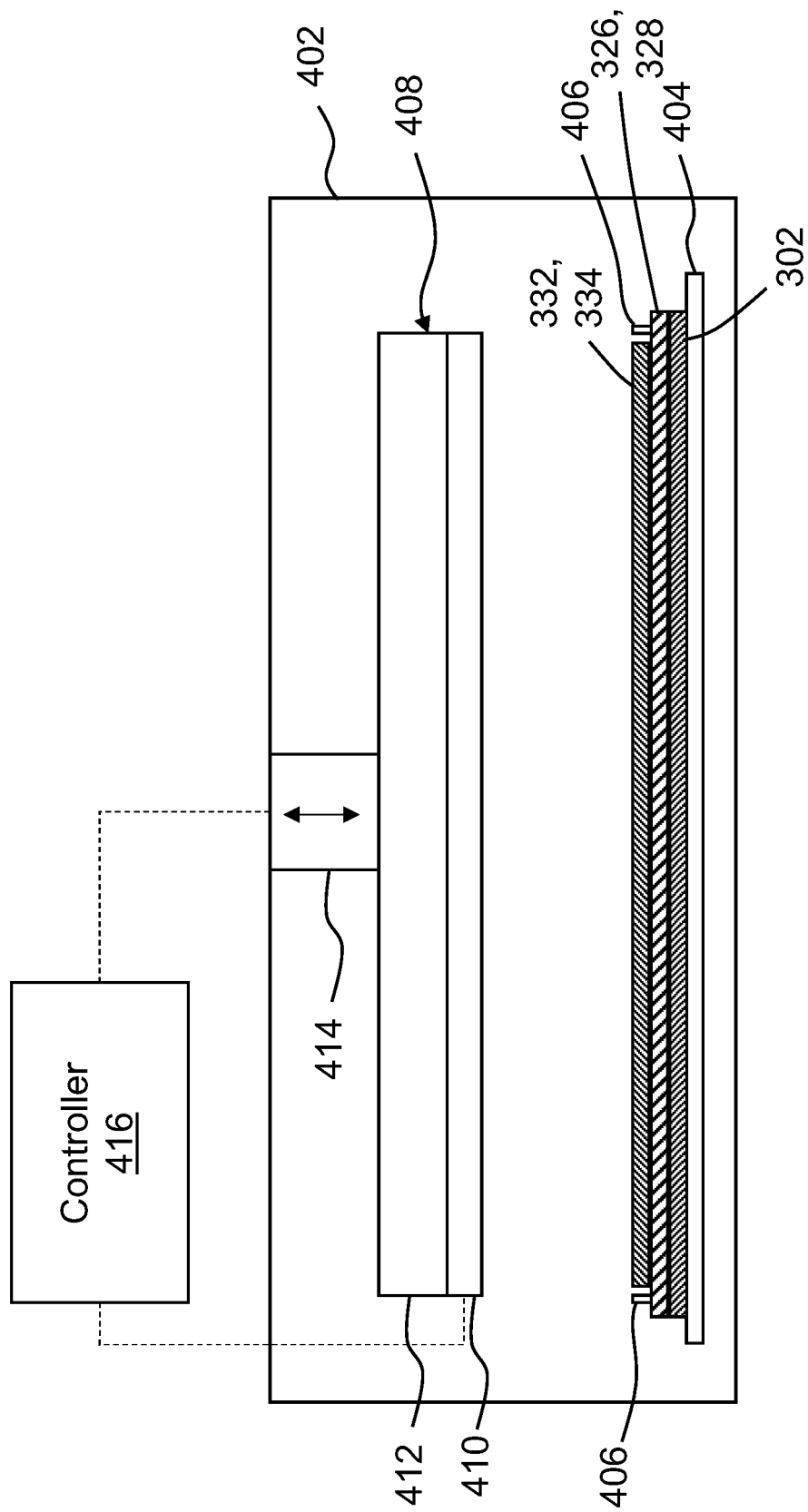
FIG. 12 is a schematic of an example system that may be used to assemble the panel assembly of FIG. 7.
Figure 13:
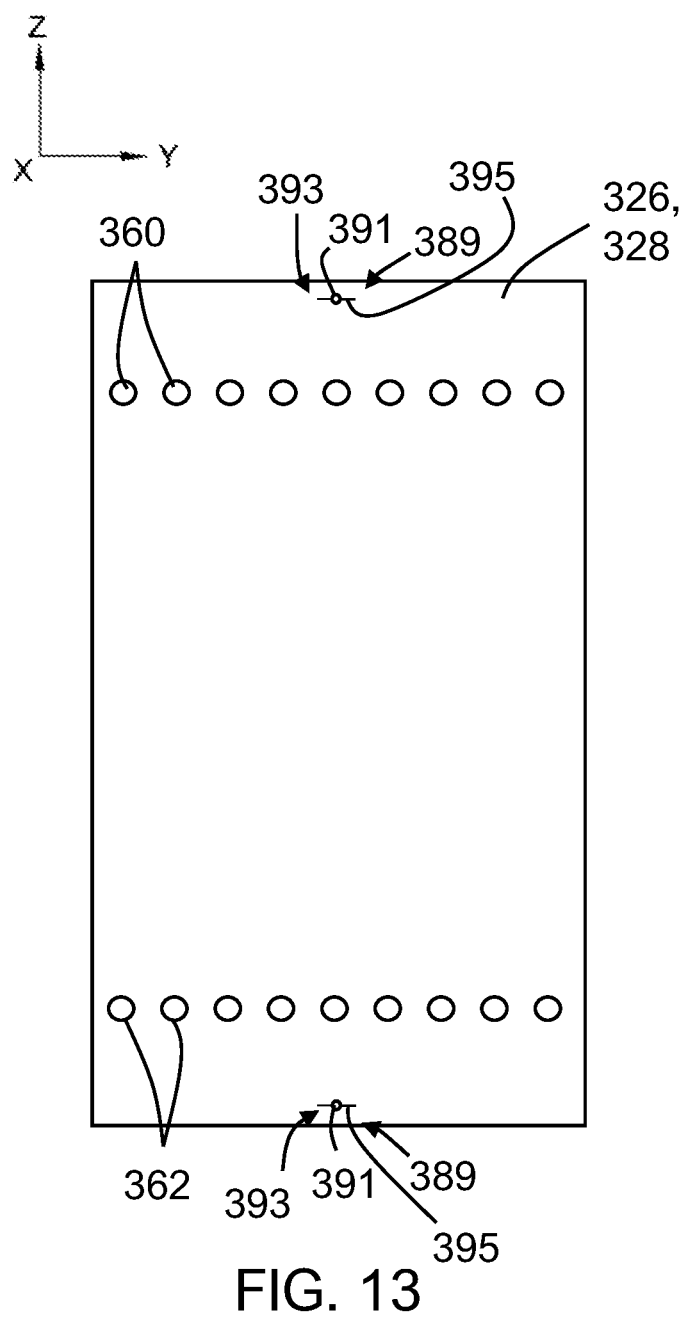
FIGS. 13-15 schematically depict a sequence of operations for assembling the panel assembly of FIG. 7.

FIGS. 10E and 10F are enlarged views of the sections E and F, respectively, of the frame 302 in FIG. 8, and depict two alignment features 388 of the frame that correspond to two alignment features 389 of each of the sheets or plates 326 and 328 (shown in FIG. 13). The alignment features 388 of the frame 302 ("frame alignment features") are located proximate the first vertical end 304 and the second vertical end 306, one of the frame alignment features 388 being located vertically above the header area 320 and the other frame alignment feature 388 being located vertically below the header area 322. Each frame alignment feature 388 is also located at a longitudinal center of the frame 302. As shown in FIG. 13, the alignment features 389 of each sheet or plate 326, 328 ("sheet alignment features") are at vertical and longitudinal locations of the plate that correspond to the vertical and longitudinal locations of the frame alignment features 388 when each plate 326, 328 is positioned on the frame 302. Pairs of corresponding frame and sheet alignment features 388, 389 facilitate aligning each plate 326, 328 to the frame 302 when attaching the plates to the frame. Each frame alignment feature 388 includes an alignment hole 390 that corresponds to an alignment hole 391 (FIG. 13) of the corresponding sheet alignment feature 389. The corresponding alignment holes 390, 391 may receive alignment pins of a workstation (e.g., alignment pins 406 of the welding system 400 shown in FIG. 12) for maintaining alignment and limiting movement between the frame 302 and the plate 326 or 328 when attaching the plate to the frame. The frame alignment features 388 and the sheet alignment features 389 may also be "flexible" and include respective flexures 392, 393 that facilitate controlling alignment, tension, and tolerance stack between the frame 302 and the plate 326 or 328 when attaching the plate to the frame, as described in more detail below.

Figure 6:
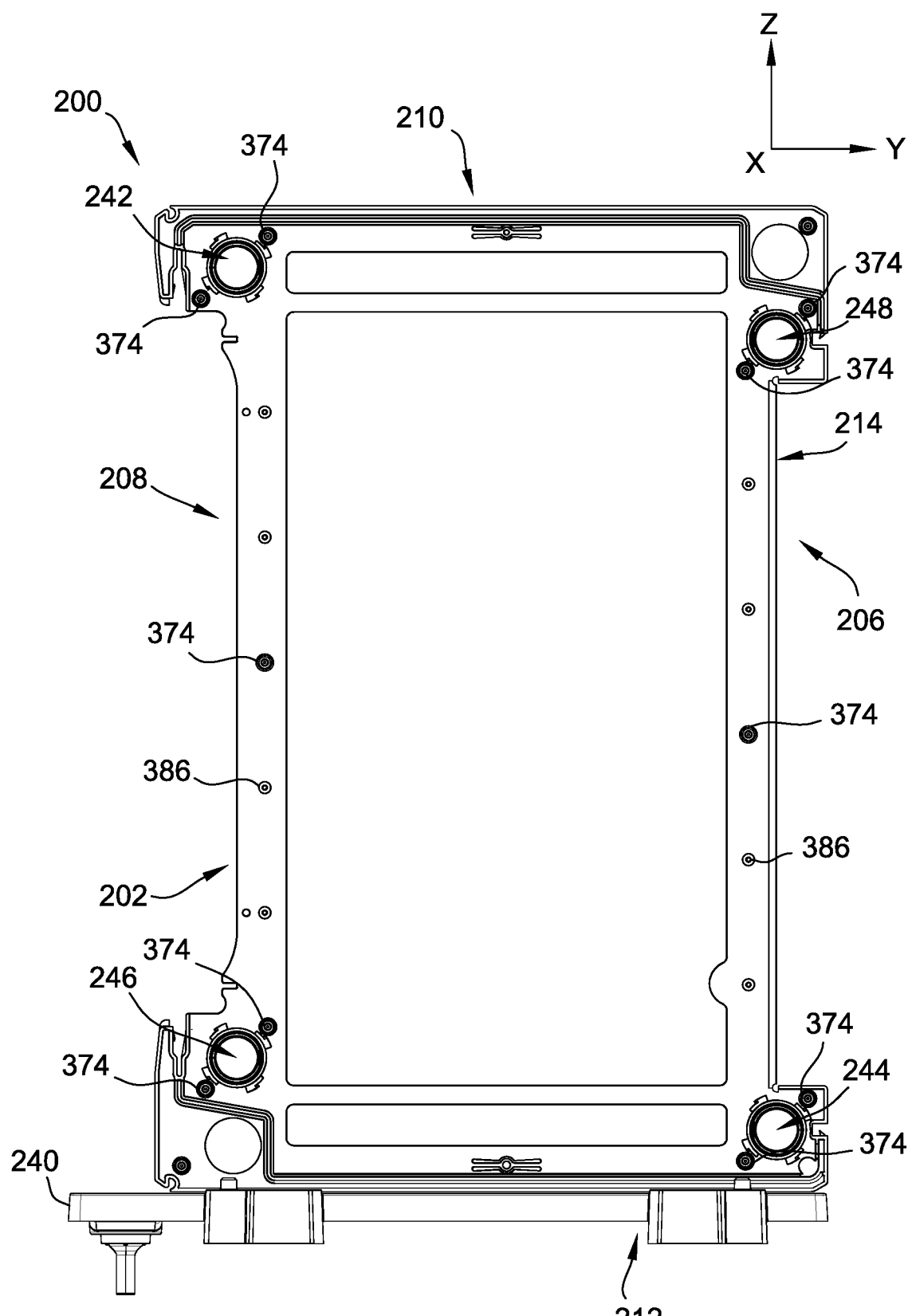
FIG. 6 is a left side elevation of the three-way heat exchanger with various components omitted, similar to FIGS. 3 and 5.

With additional reference to FIGS. 3 and 5, and to FIG. 6 which shows a left elevation of the three-way heat exchanger 200 with various components omitted similar to FIGS. 3 and 5, the panel assemblies 300 are arranged in succession or series in the lateral direction as described above. In FIGS. 3, 5, and 6, the plates 326 and 328 and the membranes 332 and 334 are omitted for convenience of illustration. When assembled and installed in the three-way heat exchanger 200, for each pair of adjacent panel assemblies 300, the membrane 332 of one of the panel assemblies 300 faces the membrane 334 of the other one of the panel assemblies 300. The airflow gaps 216 are defined between the adjacent membranes 332 and 334. Each panel assembly 300 may have a reduced width over the middle section 316, such that the panel assemblies 300 are spaced apart over their adjacent middle sections 316 to define the airflow gaps 216. Additionally and/or alternatively, the airflow gaps 216 may be defined and maintained by standoffs or spacers 386 between the middle sections 316 of adjacent panel assemblies 300. The standoffs or spacers 386 extend in the lateral direction outward from the middle section 316 proximate the longitudinal ends 308 and 310. The middle section 316 of each frame 302 may additionally and/or alternatively include the snap fittings 372 and the corresponding bores 374 (as shown in FIGS. 6 and 7) proximate the longitudinal ends 308 and 310. The snap fittings 372 and corresponding bores 374 located on the middle section 316 of the frame 302 may facilitate connecting adjacent panel assemblies 300 at the adjacent middle sections. The snap fittings 372 and corresponding bores 374 may be included in addition to the spacers 386. Alternatively, the spacers 386 may in some examples be the snap fittings 372 which engage the bores 374 of the adjacent panel assembly 300 to connect the adjacent panel assemblies and maintain the width of the airflow gaps 216.

The panel assemblies 300 are arranged in the three-way heat exchanger 200 such that, for each panel assembly, the first and second lateral faces 305 and 307 of the frame 302 are respectively oriented toward the first and second lateral sides 202 and 204 of the three-way heat exchanger 200. The first and second longitudinal ends 308 and 310 are respectively located at the first and second longitudinal sides 206 and 208 of the three-way heat exchanger 200, and the first and second vertical ends 304 and 306 are respectively located at the first and second vertical sides 210 and 212 of the three-way heat exchanger 200.

The ports 340, 342, 346, and 348 of the panel assemblies 300 align to define respective manifolds of the three-way heat exchanger 200 extending in the lateral direction through which heat transfer fluid and liquid desiccant flow to and from the panel assemblies 300 between the first and second lateral sides 202 and 204. The liquid desiccant inlet ports 340 of the panel assemblies 300 align to form a liquid desiccant inlet manifold 242 that extends between the first and second lateral sides 202 and 204 proximate to the first vertical side 210 and the second longitudinal side 208 of the three-way heat exchanger 200. The liquid desiccant outlet ports 342 of the panel assemblies 300 align to form a liquid desiccant outlet manifold 244 that extends between the first and second lateral sides 202 and 204 proximate to the second vertical side 212 and the first longitudinal side 206 of the three-way heat exchanger 200. The heat transfer fluid inlet ports 346 of the panel assemblies 300 align to form a heat transfer fluid inlet manifold 246 that extends between the first and second lateral sides 202 and 204 proximate to the second vertical side 212 and the second longitudinal side 208 of the three-way heat exchanger 200. The heat transfer fluid outlet ports 348 of the panel assemblies 300 align to form a heat transfer fluid outlet manifold 248 that extends between the first and second lateral sides 202 and 204 proximate to the first vertical side 210 and the first longitudinal side 206 of the three-way heat exchanger 200.

The panel assemblies 300 may include O-rings or other elastomeric sealing members that form liquid-tight seals between the aligning ports 340, 342, 346, and 348 of the adjacent panel assemblies to prevent fluid from leaking out of the respective manifolds 242-248. For example, as described above, elastomeric seals (not shown), such as an O-ring, may be seated within each of the grooved mouths 380 and to create a fluid-tight seal between the adjacent panel assemblies 300 at the adjacent fluid ports 340, 342, 346, 348 when the flange collars 378 are inserted into the grooved mouths 380. In some examples, the elastomeric seals 384 are radial seals (e.g., radial O-ring seals). Moreover, in each of the corner flanges 364-370, the snap fittings 372, corresponding bores 374, and the alignment holes 376 collectively surround the fluid port 340, 342, 346, 348 defined in the corner flange, which may facilitate creating and maintaining a fluid-tight seal between the adjacent ports 340, 342, 346, 348 that define the manifolds 242-248.

As shown in FIGS. 3 and 5, conduits 250, 252, 254, and 256 are used to fluidly connect the heat transfer fluid inlet 232 and outlet 234 and the liquid desiccant inlet 236 and outlet 238 to a respective manifold for heat transfer fluid and liquid desiccant entering and exiting the three-way heat exchanger 200. The liquid desiccant inlet 236 is fluidly connected to the liquid desiccant inlet manifold 242 by the conduit 250. The liquid desiccant outlet 238 is fluidly connected to the liquid desiccant outlet manifold 244 by the conduit 252. The heat transfer fluid inlet 232 is fluidly connected to the heat transfer fluid inlet manifold 246 by the conduit 254. The heat transfer fluid outlet 234 is fluidly connected to the heat transfer fluid outlet manifold 248 by the conduit 256. The conduits 250-256 may include any suitable fluid conduit (rigid and/or flexible) that enables heat transfer fluid and liquid desiccant to flow between the respective inlet and outlet and manifold, including, for example and without limitation, pipes, hoses, tubes, and combinations thereof. Each conduit 250-256 may be attached to the respective manifold 242-248 by coupling an end of the conduit to an end panel assembly 300 (i.e., the panel assembly 300 immediately adjacent to the lateral side 202 or 204) at the appropriate one of the ports 340, 342, 346, and 348. The conduits 250-256 may be attached to the appropriate port 340, 342, 346, and 348 of an end panel assembly 300 using any suitable means, include fasteners, threads, clamps, and the like.

The conduits 250 and 256 extend between the end plate 218 and the end panel assembly 300 at the first lateral side 202. The conduits 252 and 254 extend between the end plate 220 and the end panel assembly 300 at the second lateral side 204. The conduits 250 and 256 may extend through the end plate 218 to respectively define the inlet 236 or the outlet 234, may be coupled to the respective inlet 236 or outlet 234 that is defined by the end plate 218, or may be made integral with the end plate 218 and the respective inlet 236 or outlet 234 defined by the end plate 218. The conduits 252 and 254 may extend through the end plate 220 to respectively define the outlet 238 or the inlet 232, may be coupled to the respective outlet 238 or inlet 232 that is defined by the end plate 220, or may be made integral with the end plate 220 and the respective outlet 238 or inlet 232 defined by the end plate 220.

Each of the manifolds 242-248 may be closed at the lateral side 202 or 204 of the heat exchanger 200 opposite of the inlet or outlet to which the manifold is connected. The liquid desiccant inlet manifold 242 may be closed at the second lateral side 204, the liquid desiccant outlet manifold 244 may be closed at the first lateral side 202 opposite the liquid desiccant inlet manifold 242, the heat transfer fluid inlet manifold 246 may be closed at the first lateral side 202, and the heat transfer fluid outlet manifold 248 may be closed at the second lateral side 204 opposite the heat transfer fluid inlet manifold 246. The manifolds 242-248 may be closed at the respective lateral sides 202 or 204 by the end plate 218 or 220 (shown in FIGS. 2 and 4). In particular, the end plate 218 may plug the ports 342 and 346 of the panel assembly 300 at the end of the panel assemblies 300 that is adjacent to the first lateral side 202 to close the manifolds 244 and 246 at the first lateral side 202. The end plate 220 may plug the ports 340 and 348 of the panel assembly 300 at the end of the panel assemblies 300 that is adjacent to the second lateral side 204 to close the manifolds 244 and 246 at the second lateral side 204. Additionally and/or alternatively, end caps or plugs 272 and 274 (see FIG. 11) may be inserted into or otherwise disposed over the ports 342 and 346, respectively, of the panel assembly 300 adjacent to the first lateral side 202 to close the manifolds 244 and 246 at the first lateral side 202, and end caps or plugs 270 and 276 (see FIG. 11) may be inserted into or otherwise disposed over the ports 340 and 348, respectively, of the panel assembly 300 adjacent to the second lateral side 204 to close the manifolds 244 and 246 at the second lateral side 204.

Figure 11:
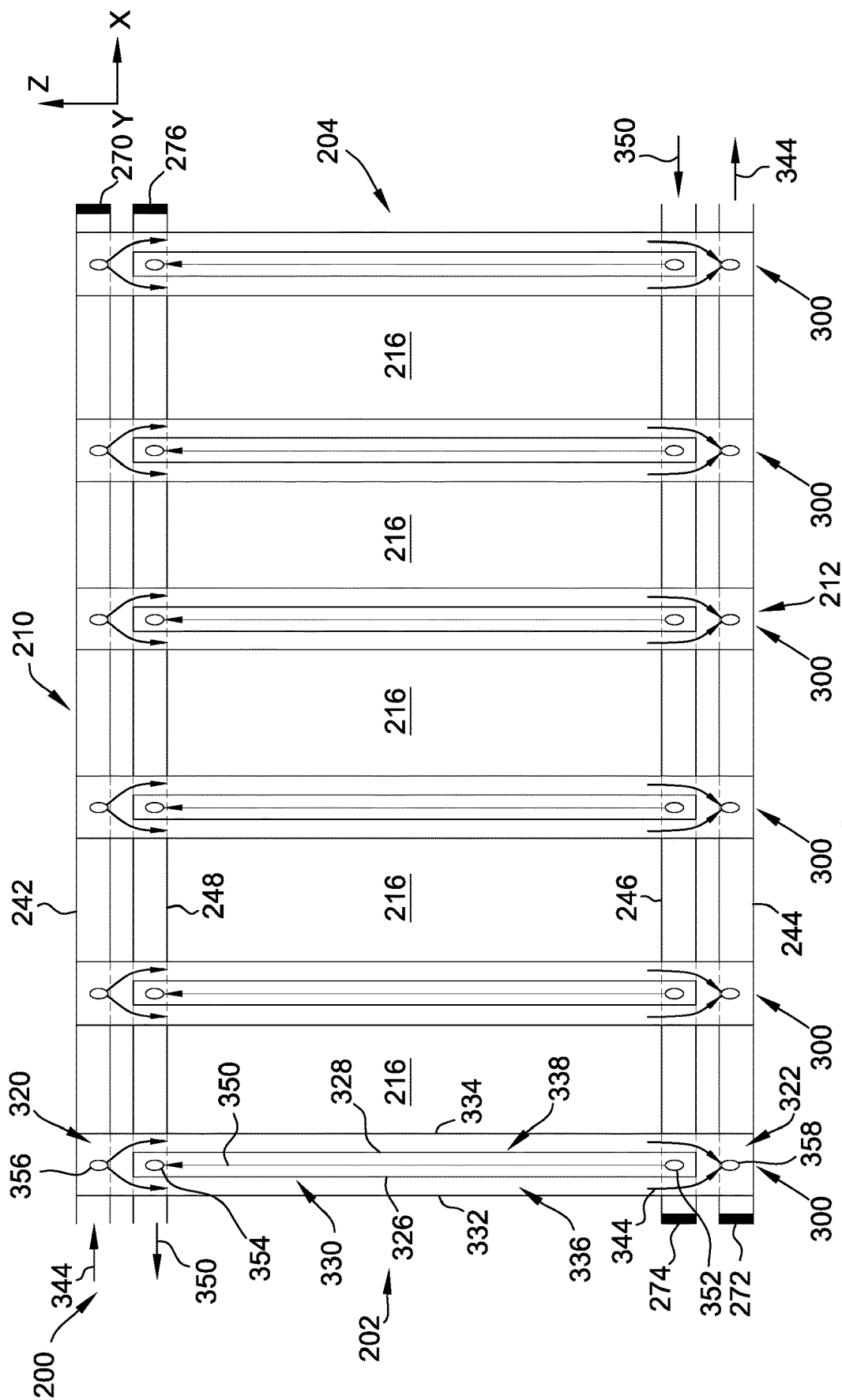
FIG. 11 is a schematic showing flow of liquid desiccant and heat transfer fluid through the three-way heat exchanger of FIGS. 2-6.

Referring now to FIG. 11, operation of the three-way heat exchanger 200 will now be described. FIG. 11 is a schematic showing an interior view of the three-way heat exchanger 200 to depict flow of liquid desiccant and the heat transfer fluid through the manifolds 242-248 and the panel assemblies 300. In the schematic of FIG. 11, panel assemblies 300 are depicted with features exaggerated and/or simplified for convenience of illustration and description.

In an example operation of the heat exchanger 200, an inlet air stream (e.g., the first or second inlet air stream 110 or 114 shown in FIG. 1) enters via the airflow inlet 224 and flows through the air gaps 216 defined between adjacent panel assemblies 300 in the airflow direction 278. The air flowing through the air gaps 216 is treated by liquid desiccant, indicated by the flow lines 344, and heat transfer fluid, indicated by the flow lines 350, that are channeled through each of the panel assemblies 300. In some operations, the liquid desiccant 344 is concentrated liquid desiccant 152 from the liquid desiccant circuit 108 and the heat transfer fluid 350 is conditioner heat transfer fluid from the conditioner sub-system 104 shown in FIG. 1, and the heat exchanger 200 is used to cool and dehumidify the air flowing through the air gaps 216. In other operations, the liquid desiccant 344 is diluted liquid desiccant 154 from the liquid desiccant circuit 108 and the heat transfer fluid 350 is regenerator heat transfer fluid from the regenerator sub-system 106 shown in FIG. 1, and the heat exchanger 200 is used to heat and reject moisture into the air flowing through the air gaps 216.

The liquid desiccant 344 flows into the liquid desiccant inlet manifold 242 from the first lateral side 202, via the liquid desiccant inlet 236 and the conduit 250 (shown in FIGS. 3-5). The liquid desiccant 344 enters into the liquid desiccant header area 320 of each panel assembly 300 from the liquid desiccant inlet manifold 242 via the apertures 356. In each panel assembly 300, the liquid desiccant 344 flows from the liquid desiccant header area 320, into the liquid desiccant channels 336 and 338 via the apertures 360 on each plate 326 and 328 (shown in FIGS. 7 and 8), downward through the liquid desiccant channels 336 and 338, and into the liquid desiccant header area 322 via the apertures 362 on each plate 326 and 328 (shown in FIGS. 7 and 8). As the liquid desiccant 344 flows behind the membranes 332 and 334 of the panel assemblies 300, the liquid desiccant 344 absorbs moisture from or desorbs moisture into the air flowing through the air gaps 216 adjacent to the membranes 332 and 334. Moisture is permitted to permeate through each of the membranes 332 and 334 to enable the moisture to transfer between the liquid desiccant 344 and air in the air gaps 216. The liquid desiccant 344, having absorbed or desorbed moisture, exits each panel assembly 300 from the respective liquid desiccant header area 322 via the apertures 358, and flows through the liquid desiccant outlet manifold 244 toward the second lateral side 204. The liquid desiccant 344 exits the heat exchanger 200 via the conduit 252 and the liquid desiccant outlet 238 (shown in FIG. 5).

The heat transfer fluid 350 flows into the heat transfer fluid inlet manifold 246 from the second lateral side 204, via the heat transfer fluid inlet 232 and the conduit 254 (shown in FIGS. 4 and 5). The heat transfer fluid 350 enters into each panel assembly 300 from the heat transfer fluid inlet manifold 246 via the apertures 352. In each panel assembly 300, the heat transfer fluid 350 flows upward through the heat transfer fluid channel 330. The heat transfer fluid 350 flowing through the channel 330 is in thermal communication with the liquid desiccant 344 flowing through the liquid desiccant channels 336 and 338. Heat is transferred between the heat transfer fluid 350 and the liquid desiccant 344 to remove heat from or reject heat into the air flowing through the air gaps 216, depending on the operating mode of the heat exchanger 200. The heat transfer fluid 350, having absorbed or rejected heat, exits each panel assembly 300 via the apertures 354, and flows through the heat transfer fluid outlet manifold 248 toward the first lateral side 202. The heat transfer fluid 350 exits the heat exchanger 200 via the conduit 256 and the heat transfer fluid outlet 234 (shown in FIGS. 3-5).

The direction of flow of the heat transfer fluid 350 and the liquid desiccant 344 in the illustrated embodiment is by way of example only, and may change in other embodiments of the heat exchanger 200. For example, the liquid desiccant 344 may flow upward through the desiccant channels 336 and 338 on the panel assemblies 300. In these examples, the direction of flow of the liquid desiccant 344 through the liquid desiccant inlet 236 and outlet 238 and the liquid desiccant inlet and outlet manifolds 242 and 244 would also be reversed. The heat transfer fluid 350 may flow downward through the heat transfer channels 330 of the panel assemblies 300. In these examples, the direction of flow of the heat transfer fluid 350 through the heat transfer fluid inlet and outlets 232 and 234 and the heat transfer fluid inlet and outlet manifolds 246 and 248 would also be reversed. The liquid desiccant 344 and the heat transfer fluid 350 flow in counter-flow relation in the illustrated example, but may flow in the same direction through the panel assemblies in alternative examples.

Referring now to FIGS. 12-16, example systems and methods for assembling one or more of the panel assemblies 300 (also referred to as a multilayer panel) will now be described. FIG. 12 is a schematic of an example system 400 that may be used to attach each plate 326, 328 (also referred to as heat exchange sheets 326, 328 or sheets 326, 328) to the frame 302 and/or each membrane 332, 334 to the respective sheet 326, 328. The welding system 400 includes a work chamber 402 and a work platform 404 positioned in the chamber 402. The work platform 404 is sized and shaped to support the frame 302, the plates 326, 328, and the membranes 332, 334. The work platform 404 includes two alignment pins 406 that are sized, shaped, and positioned on the work platform to be inserted into the two pairs of corresponding frame alignment features 388 (FIGS. 10E and 10F) and sheet alignment features 389 (FIG. 13). FIG. 12 schematically depicts the frame 302 positioned on the work platform 404 and the heat exchange sheet 326 or 328 positioned on the frame, with the alignment pins 406 extending through the corresponding frame and sheet alignment features 388, 389. In particular, each alignment pin 406 extends through a corresponding pair of an alignment hole 390 of the frame 302 and an alignment hole 391 of the sheet 326 or 328. Inserting the alignment pins 406 through the pairs of corresponding pairs alignment holes 390, 391 operates to maintain alignment and limit relative movement between the frame 302 and the sheet 326 or 328 when the system 400 is used to attach (e.g., weld) the sheet 326 or 328 to the frame 302.

In the example illustrated in FIG. 12, one sheet 326 or 328 having the membrane 332 or 334 previously attached thereto is positioned on a lateral face 305 and 307 of the frame 302 for attaching the sheet 326 or 328 to the frame 302. This is for example only, according to one example method of assembling the panel assembly 300 using the system 400. In other methods, the frame 302 may have the sheet 326 or 328 positioned thereon without the membrane 332 or 334 having been previously attached to the sheet. The system 400 may additionally and/or alternatively be used to attach (e.g., heat seal) the membrane 332 or 334 to the sheet 326 or 328 before attaching the sheet 326 or 328 to the frame 302. In such methods, the sheet 326 or 328 may be positioned on the work platform 404 with the alignment pins 406 extending through the alignment holes 391 and the membrane 332 or 334 is positioned across the sheet 326 or 328 between the alignment holes 391, without inserting the alignment pins 406 through the membrane 332 or 334. In some examples, the membrane 332 or 334 may also include alignment features corresponding to the sheet alignment features 388 for inserting the alignment pins therethrough. Both sheets 326 and 328, with or without the respective membranes 332 and 334 previously attached, may be attached (e.g., welded) to the frame 302 using the system 400. In such methods, the first sheet 326 or 328 is attached to the frame 302 with the first sheet 326 or 328 positioned on the frame 302 as shown in FIG. 12, and the second sheet 328 or 326 is attached to the frame 302 with the frame 302 flipped (i.e., rotated 180° about a vertical axis extending between the vertical ends 304 and 306) such that the first sheet 326 or 328 previously attached (and, optionally, the membrane 332 or 334) is sandwiched between the frame and the work platform 404 and the second sheet 328 or 326 is positioned on the other lateral face 307 or 305 of the frame 302. The alignment pins 406 may extend through the alignment holes 388 of the frame 302 and the alignment holes 389 of each sheet 326 and 328 respectively positioned on the lateral faces 305 and 307 of the frame 302.

Referring to FIGS. 10E-10F and 13, the frame alignment features 388 and the sheet alignment features 389 are flexible and include respective flexures 392, 393 that facilitate controlling alignment, tension, and tolerance stack between the frame 302 and the sheet 326 or 328 when attaching the plate to the frame. The flexures 392, 393 allow the respective alignment holes 390, 391 to move or flex. The flexures 392 of the frame 302 (FIGS. 10E and 10F) are each formed by two cut-outs 394 that are located above and below the respective alignment hole 390 and define a "bow tie" shape. The flexure 392 formed by the two cut-outs 394 is a filament in which the alignment hole 390 is defined and allows the alignment hole to move or flex within the two cut-outs 394. The flexures 393 of the sheets 326 and 328 (FIG. 13) are each formed by two slits 395 located on each side of the alignment hole 391. The flexure 393 formed by the two slits 395 is a flexible region radiating out from the alignment hole 391 that allows the alignment hole 391 to move or flex.

Referring to FIG. 12, the system 400 also includes an attachment tool 408 (e.g., a laser welder or a heat sealer) operably positioned in the chamber 402. The tool 408 includes a working element 410 (e.g., a heater or a laser) connected to a support 412. The support 412 is connected to an arm 414 (or multiple arms 414) of the tool 408 that operates to move the support 412 and the working element 410 within the chamber 402 relative to the work platform 404. Movement of the arm 414 may be facilitated by any suitable means, such as linear actuators, motors, hydraulic cylinders, pneumatic cylinders, and the like. Movement of the arm 414 controls movement of the support 412 and the working element 410 for attaching the sheets 326 and 328 to the frame 302 and/or attaching the membranes 332 and 334 to the respective sheets 326 and 328. In the example system 400, the arm 414 is operable to move the support 412 and the working element 410 downward toward and upward away from the work platform 404. The arm 414 may additionally and/or alternatively move the support 412 and working element 410 in another direction. The arm 414 may be operable for multi-axis movement in some examples. The working platform 404 may additionally and/or alternatively be operably coupled to one or more actuators (e.g., linear actuators, motors, hydraulic cylinders, pneumatic cylinders, and the like) for controlling movement, along a single axis or multiple axes, of the working platform 404 relative to the support 412 and the working element 410.

Figure 14:
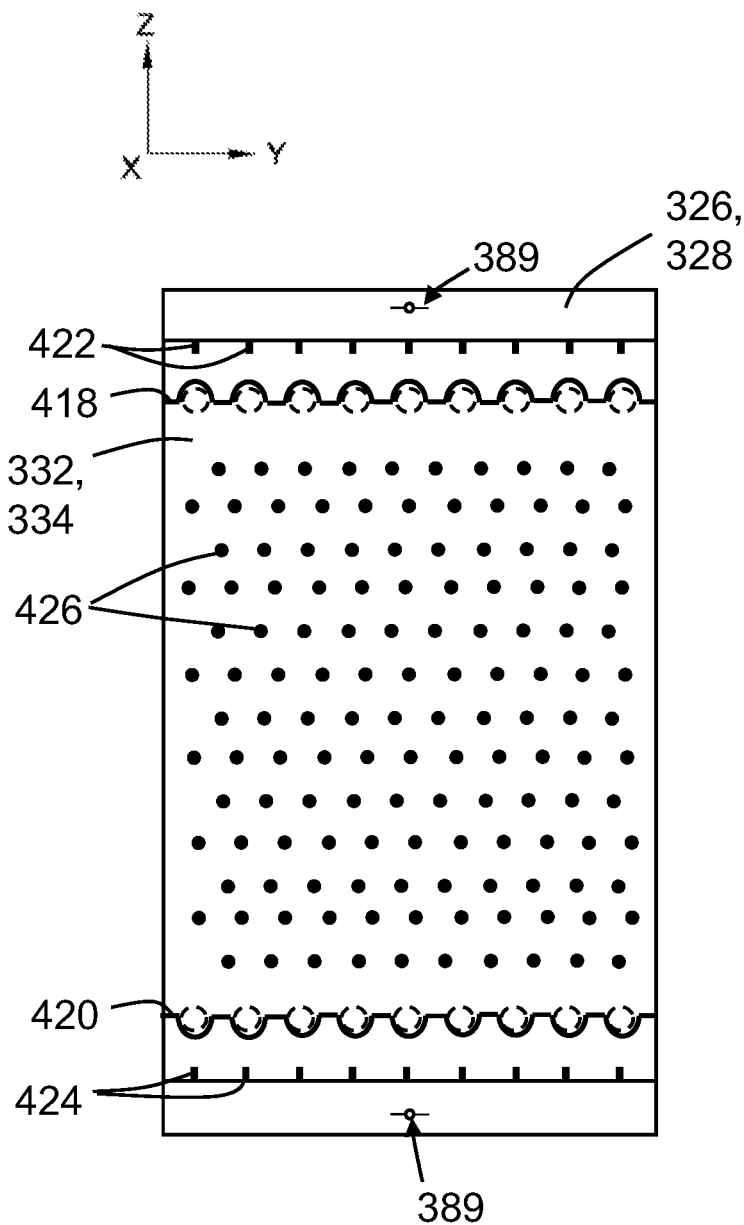
Figure 15:
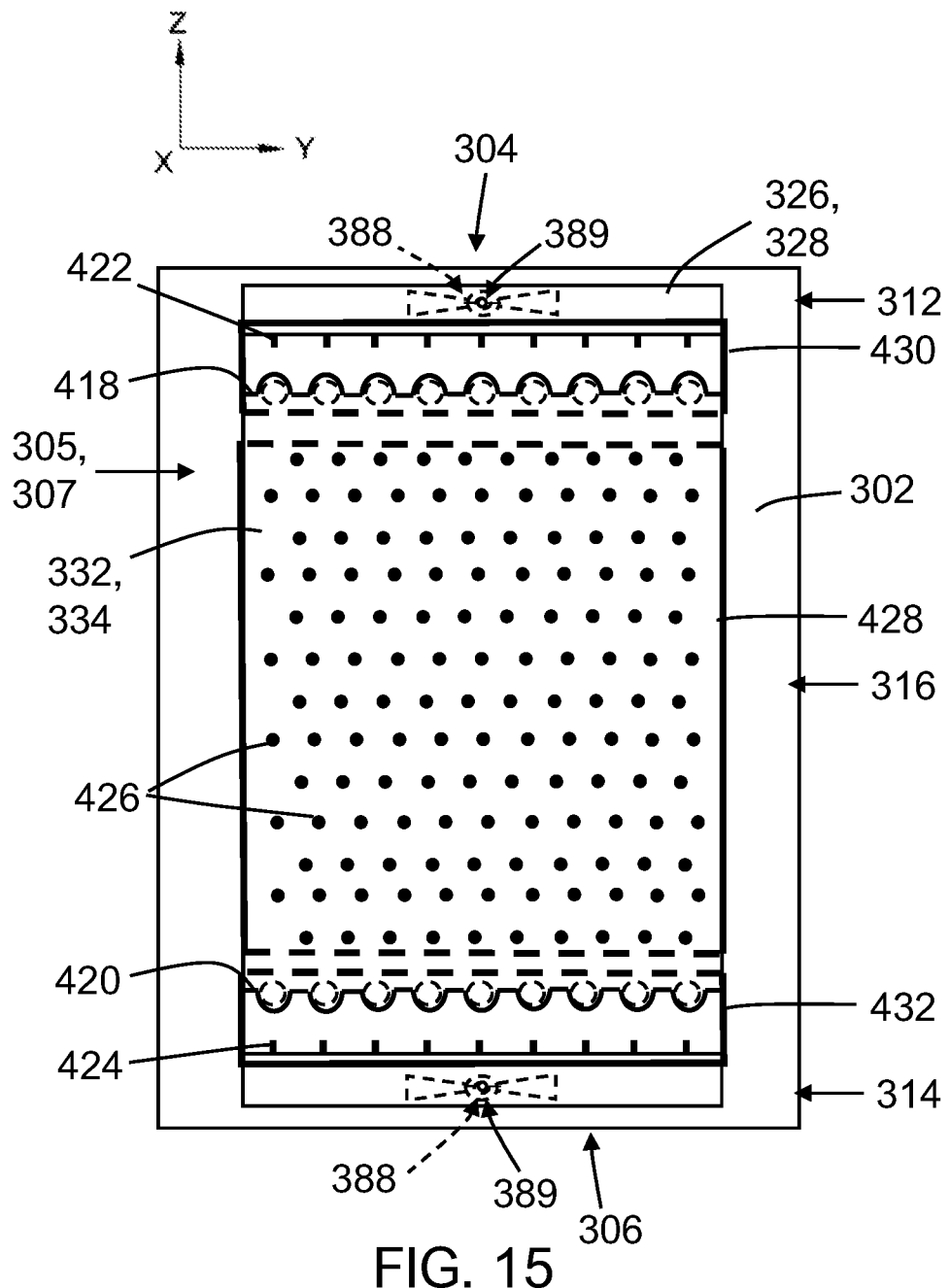

The working element 410 (e.g., heater or laser) is operable to form suitable seams or patterns for attaching (e.g., welding) the sheets 326 and 328 to the frame 302 and/or to for attaching (e.g., heat sealing) the membranes 332 and 334 to the respective sheets 326 and 328. An example heat seal pattern between the membrane 332 or 334 and the sheet 326 or 328 is shown in FIG. 14 and an example welding pattern between the sheet 326 or 328 and the frame 302 is shown in FIG. 15. Attaching the sheets 326 and 328 to the frame 302 may be performed using the same tool 408 as is used to attach the membranes 332 and 334 to the respective sheets 326 and 328, or different tools 408 may be used for these operations. Where different tools 408 are used, the different tools 408 may be operated in the same or a different chamber 402. Suitably, the working element 410 of each tool 408 is operable to form the welds and/or the heat seals in a single operation. Alternatively stated, the working element 410 of the tool 408 (e.g., a laser welder or a heat sealer) may "stamp" or "punch" the welds or heat seals in one simultaneous stroke, rather than tracing out the weld patterns or forming the heat seals individually. Forming the welds or heat seals in a single operation may significantly reduce time and costs associated with attaching the membranes 332, 334 to the sheets 326, 328 and/or attaching the sheets 326, 328 to the frame 302. The alignment holes 390 and 391 and the flexures 392 and 393 may facilitate precise alignment and suitable tension of the frame 302 and the sheets 326 and 328 to enable the welds or heat seals to be formed in the single operation as described.

The system 400 also includes a controller 416 connected in communication with the attachment tool 408, and configured to control operation of the tool 408 (e.g., by controlling operation of the arm 414 and/or the working element 410). For example, the controller 416 may be configured to control operation of the arm 414 to move the support 412 and the working element 410 towards and away from the work platform 404. The controller 416 may additionally and/or alternatively be configured to control operation of the working element 410 for forming a suitable weld or heat seal pattern, depending on whether the tool 408 is being used to perform a welding operation to attach the sheets 326 and 328 to the frame 302 and/or to attach the membranes 332 and 334 to the respective sheets 326 and 328.

The controller 416 may include any suitable computer and/or other processing unit, including any suitable combination of computers, processing units and/or the like that may be communicatively connected to one another and that may be operated independently or in connection within one another (e.g., the controller 416 may form all or part of a controller network). The controller 416 may include one or more modules or devices, one or more of which is enclosed within a single housing, or may be located remote from one another. The controller 416 may include one or more processor(s) and associated memory device(s) configured to perform a variety of computer-implemented functions (e.g., performing the functions disclosed herein). As used herein, the term "processor" refers not only to integrated circuits, but also refers to a controller, a microcontroller, a microcomputer, a programmable logic controller (PLC), an application specific integrated circuit, and other programmable circuits. Additionally, memory device(s) of the controller 416 may be or include memory element(s) including, but not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory device(s) may be configured to store suitable computer-readable instructions that, when implemented by the processor(s), configure or cause the controller 416 to perform various functions described herein including, but not limited to, controlling the tool 408.

The controller 416 may communicate with one or more components of the tool 408 via a communication interface coupled in communication with one or more of these devices. The communication interface may include, without limitation, a wired network adapter, a wireless network adapter, a mobile telecommunications adapter, a serial communication adapter, or a parallel communication adapter. The communication interface may receive a data signal from, or transmit a data signal to, one or more remote devices, such as the tool 408. The controller 416 may also include a presentation interface coupled to one or more of the processors. The presentation interface may present information, such as a user interface, to an operator of the system 400. In one embodiment, the presentation interface includes a display adapter (not shown) that is coupled to a display device (not shown), such as a cathode ray tube (CRT), a liquid crystal display (LCD), an organic LED (OLED) display, or an "electronic ink" display. In some embodiments, the presentation interface includes one or more display devices. In addition, or alternatively, the presentation interface includes an audio output device (not shown), for example, without limitation, an audio adapter, a speaker, or a printer (not shown). The controller 416 may also include a user input interface coupled to one or more of the processors and operable to receive input from the operator. The user input interface may include, for example, and without limitation, a keyboard, a pointing device, a mouse, a stylus, one or more input buttons, a touch sensitive panel, such as, without limitation, a touch pad or a touch screen, and/or an audio input interface, such as, without limitation, a microphone. A single component, such as a touch screen, may function as both a display device of the presentation interface and the user input interface.

Figure 16:
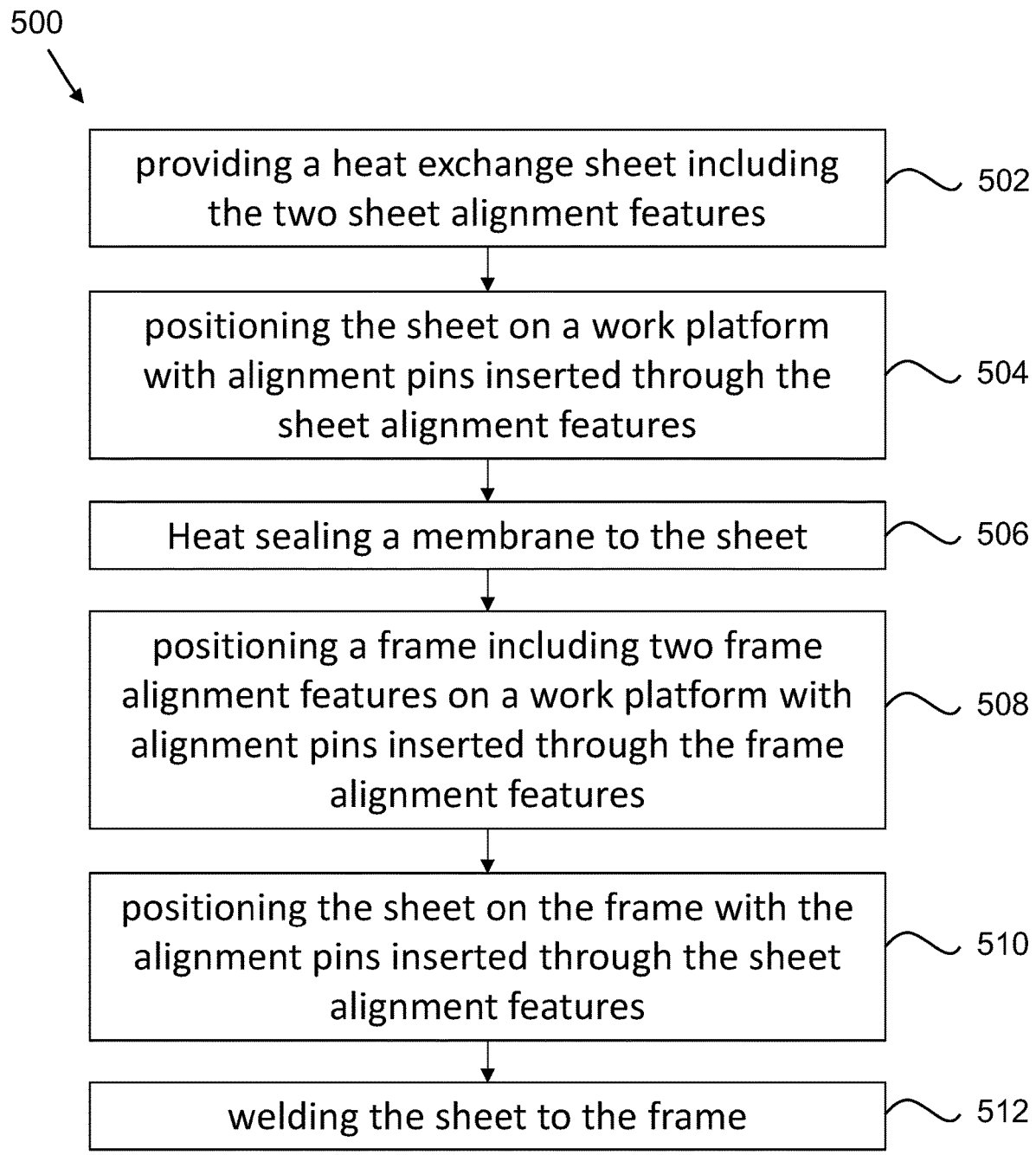
FIG. 16 is an example method of assembling the panel assembly of FIG. 7 in accordance with the sequence of operations of FIGS. 13-15.

FIGS. 13-15 depict a sequence of operations that may be performed to assemble the multilayer panel 300 (shown in FIG. 7) in accordance with a method 500 shown in FIG. 16. The method 500 may be performed using one or more systems that include a work platform and a suitable attachment tool (e.g., one or more of the system 400 shown in FIG. 12). FIG. 13 is a schematic of a heat exchange sheet 326, 328 included in the panel assembly 300. FIG. 14 is a schematic of a membrane 332, 334 attached to the sheet 326 or 328 of FIG. 13. FIG. 15 is a schematic of the sheet 326, 328, with the membrane 332, 334 of FIG. 14 attached to the frame 302. The sequence of operations shown in FIG. 13-15 and the method 500 of FIG. 16 are provided by way of example only, and the operations described may be performed in any suitable order. For example, the sheet 326 or 328 may be attached to the frame 302 before the membrane 332 or 334 is attached to the sheet 326 or 328. The operations may also be repeated for both heat exchange sheets 326 and 328 and membranes 332 and 334 to assemble the multilayer panel 300 including two sheets 326 and 328, one sheet 326, 328 attached to each lateral face 305, 307 of the frame 302, and two membranes 332, 334, one membrane 332, 334 attached to each sheet 326, 328.

The method 500 includes providing 502 the heat exchange sheet 326, 328 shown in FIG. 13 that includes the two alignment features 389 and the two series of apertures 360, 362. The two series of apertures 360, 362 are located between the two alignment features 389. One alignment feature 389 is located adjacent each vertical end of the sheet 326, 328 (relative to the orientation shown in FIG. 13). The series of apertures 360 is located proximate the "top" alignment feature 389 and the series of apertures 362 is located proximate the "bottom" alignment feature 389.

The method 500 also includes positioning 504 the heat exchange sheet 326, 328 on a work platform (e.g., the work platform 404 of FIG. 12) such that two alignment pins (e.g., the alignment pins 406) are inserted through the two alignment holes 391 of the heat exchange sheet 326, 328. The method 500 also includes attaching (e.g., heat sealing) 506 the membrane 332, 334 to the heat exchange sheet 326, 328 positioned on the work platform, such that a desiccant channel 336, 338 (FIG. 9) is defined between the membrane 332, 334 and the sheet 326, 328. As shown in FIG. 14, the membrane 332, 334 is shorter in height than the sheet 326, 328, and is positioned on the sheet such that the membrane overlaps the two series of apertures 360, 362 and the alignment features 389 are uncovered by the membrane. The membrane 332, 334 does not include alignment features that correspond to the alignment features 389 of the sheet 326, 328 in this example. The membrane 332, 334 may be positioned and aligned on the sheet by visual inspection such that the apertures 360, 362 are sufficiently overlapped by the membrane, and the alignment features 389 remain uncovered. In other examples, the membrane 332, 334 may include alignment features that facilitate centering the membrane on the sheet 326, 328.

Attaching 506 the membrane 332, 334 to the heat exchange sheet 326, 328 may be performed using a heat sealing tool (e.g., the tool 408) that operates to heat seal the membrane to the sheet along various "heat seals" (e.g., lines, seams, patterns) as shown in FIG. 14. In the illustrated example, two heat seal lines 418, 420 are respectively formed adjacent the two series of apertures 360, 362, such that the desiccant channel 336, 338 is connected to both series of apertures 360, 362 and is sealed vertically above the apertures 360 and vertically below the apertures 362. Each heat seal line 418, 420 includes arcs that complement the apertures 360, 362, respectively, and horizontal (longitudinal) segments connecting each arc.

Each aperture 360, 362 is centered within a respective arc of the heat seal lines 418, 420, which provides a space for desiccant to flow through each aperture 360, 362 between the sheet 326, 328 and the membrane 332, 334. Misalignment between the apertures 360, 362 and the heat seal lines 418, 420 may result in the apertures 360 and/or 362 being too close to, or partially covered, by the heat seal lines 418 and/or 420, which is disadvantageous because it restricts or impedes desiccant flow through the desiccant channel 336, 338, increases tensile stress in the membrane 332, 334, and/or otherwise negatively impacts performance of the panel assembly 300. Thus, in one example of heat sealing, alignment between the heat seal lines 418, 420 and the series of apertures 360, 362, and more particularly the centering of the apertures within the arcs of the heat seal lines, is controlled using the alignment features 389 of the heat exchange sheet 326, 328. That is, the alignment pins 406 that are inserted in the alignment holes 391 of the sheet 326, 328 operate to control alignment between the sheet and the heat sealing tool to ensure that the arcs of the heat seal lines 418, 420 and the respective apertures 360, 362 remain centered.

The flexures 393 may also operate to control alignment between the sheet 326, 328 and the heat sealing tool, as well as tension within the sheet, when positioned on the work platform. In particular, the flexures 393 compensate for dimensional variations (e.g., height variations) in the sheet 326, 328 that may result, for example, from manufacturing tolerances and cause variations in the vertical spacing between the alignment holes 391. The likelihood for such variations may be exacerbated or changed depending, for example, on the material used for the sheet 326, 328. For example, thermoplastic or polymer materials (e.g., polyolefins such as polypropylene and/or polyethylene) that may be used to make the sheet 326, 328 may exhibit a large variation in dimensions. Such variations may result in undesired tension or stress on the sheet 326, 328 when the sheet 326, 328 is positioned on the work platform 404 and the alignment pins 406 are inserted in the alignment holes 391, which may lead to deformation of the sheet 326, 328 (e.g., bowing or stretching) and misalignment between the sheet 326, 328 and the heat sealing tool. The flexures 393 enable the alignment holes 391 to flex, which facilitates reducing the negative impact that manufacturing tolerances may have on the alignment between the sheet 326, 328 and the heat sealing tool by reducing or eliminating any deformation in the sheet in the areas that require precise alignment with the heat sealing tool (e.g., proximate the series of apertures 360, 362).

FIG. 14 shows additional heat seals that may be formed between the sheet 326, 328 and the membrane 332, 334. For example, heat seal "dashes" 422, 424 may be formed at opposite vertical ends of the membrane 332, 334. The heat seal dashes 422 are formed above the heat seal line 418 and the heat seal dashes 424 are formed below the heat seal line 420. The heat seal dashes 422, 424 may facilitate retaining "excess" portions of the membrane 332, 334 above and below the heat seal line 418, 420, respectively. The heat seal dashes 422, 424 may also facilitate increasing the reliability of the attachment between the membrane 332, 334 and the sheet 326, 328. The dashes 422, 424 may be formed at longitudinal locations corresponding to the longitudinal location of the arcs of the heat seal lines 418, 420. Discrete heat seals or heat seal "dots" 426 may also be formed between the heat seal lines 418 and 420. The heat seal dots 426 may define discrete flow paths for the desiccant flowing between the sheet 326, 328 and the membrane 332, 334. Any suitable number and/or arrangement of the heat seal dots 426 may be implemented. The number and/or location of the heat seal dots 426 may be selected to facilitate controlling distribution and/or a flow rate of the desiccant through the desiccant channel 336, 338. Additional detail on suitable patterns for the heat seal dots 426 is described in U.S. Pat. No. 10,921,001, issued on Feb. 16, 2021, which is incorporated by reference in its entirety.

As described above, the heat sealing tool (e.g., the tool 408) may be operable to heat seal the membrane 332, 334 to the heat exchange sheet 326, 328 in a single heat seal operation, such that the heat sealing tool stamps or punches each of the heat seals (e.g., the heat seal lines 418, 420, the heat seal dashes 422, 424, and the heal seal dots 426) in one stroke. This requires precise alignment between the heat sealing tool and the sheet 326, 328 to ensure that the heat seals are not misaligned with the apertures 360, 362. Suitably, the flexible alignment features 389 of the sheet 326, 328, with the alignment pins 406 of the work platform 404 inserted therethrough, operate to control alignment, tension, tolerance, and movement of the sheet relative to the platform and the heat sealing tool such that the heat sealing can be performed in a single operation.

Referring to FIG. 16, the method 500 also includes positioning 508 the frame 302 on a work platform (e.g., the work platform 404 of FIG. 12), which may be the same work platform on which the heat exchange sheet 326, 328 is positioned 504 before attaching the membrane 332, 334 to the sheet or may be a different work platform. The frame 302 is positioned 508 on the work platform 404 such that two alignment pins (e.g., the alignment pins 406) are inserted through the two alignment holes 390 (FIGS. 10E and 10F) of the frame 302. The method 500 also includes positioning 510 the heat exchange sheet 326, 328 on the frame 302. The sheet 326, 328 is positioned 510 on the frame 302 such that the sheet extends across the middle section 316 and the header sections 312 and 314 of the frame, and such that the sheet alignment features 389 are aligned with the corresponding frame alignment features 388 (shown in FIG. 15). The alignment pins 406 inserted through the two alignment holes 390 of the frame 302 are also inserted through the corresponding alignment holes 391 of the sheet 326, 328 positioned 510 on the frame 302 to facilitate controlling alignment between the sheet and the frame and limit relative movement therebetween.

The method 500 also includes attaching (e.g., laser welding) 512 the sheet 326, 328 to the frame 302. The heat exchange sheet 326, 328 may be positioned 510 on and attached 512 to the frame 302 after attaching 506 the membrane 332, 334 to the sheet, or before the membrane is attached 506. Attaching 512 the sheet 326, 328 to the frame 302 may be performed using a laser welding tool (e.g., the tool 408) that operates to laser weld the sheet to the frame along various "welds" (e.g., paths or seams) as shown in FIG. 15. In the illustrated example, the sheet 326, 328 is attached to the middle section 316 of the frame 302 along a middle weld 428, the first header section 312 of the frame along a first outer weld 430 (or "top" weld), and the second header section 314 of the frame along a second outer weld 432 (or "bottom" weld). The middle weld 428 envelops and seals the sheet 326, 328 around the heat transfer fluid area 324 defined by the frame 302. The top weld 430 envelops and seals the sheet 326, 328 around the first liquid desiccant header area 320 defined by the frame 302. The bottom weld 432 envelops and seals the sheet 326, 328 around the second liquid desiccant header area 322 defined by the frame 302. The heat transfer fluid area 324 and the liquid desiccant header areas 320, 322 are shown, for example, in FIG. 8. The series of apertures 360 of the sheet 326, 328 are enveloped by the top weld 430 and aligned with the liquid desiccant header area 320, and the series of apertures 362 of the sheet are enveloped by the bottom weld 432 and aligned with the liquid desiccant header area 322. The apertures 360, 362 connect the desiccant channel 336, 338 defined between the membrane 332, 334 and the sheet 326, 328 with the liquid desiccant header areas 320, 322, and the region of the sheet located between the apertures 360, 362 and sealed to the middle section 316 by the middle weld 428 separates the desiccant channel from the heat transfer fluid area 324. The welds 428, 430, and 432 also operate to restrict flow of heat transfer fluid into the liquid desiccant header areas 320, 322 and restrict flow of liquid desiccant into the heat transfer fluid area 324 or channel 330 (shown in FIG. 9).

As shown in FIG. 15, the heat seals (e.g., the heat seal lines 418, 420, the heat seal dashes 422, 424, and the heat seal dots 426) used to attach 506 the membrane 332, 334 to the sheet 326, 328 have minimal overlap with the welds 428, 430, 432 used to attach 512 the sheet to the frame 302. The heat seal line 418 and heat seal dashes 422 are substantially surrounded by the top weld 430, the heat seal dots 426 are substantially surrounded by the middle weld 428, and the heat seal line 420 and heat seal dashes 424 are substantially surrounded by the bottom weld 428. This may suitably minimize energy applied to the membrane 332, 334 and the sheet 326, 328 when assembling the multilayer panel 300. The welds 428, 430, and 432 may also be substantially formed between the sheet 326, 328 and the frame 302 only, to reduce or eliminate weld seams formed with the membrane 332, 334. FIG. 15 depicts internal weld portions of the welds 428, 430, 432 (i.e., portions of the welds covered by the membrane 332, 334) in dashed lines. In the illustrated example, the internal weld portions of the welds 428, 430, 432 are on the frame bars 325, 327 (shown in FIG. 8) of the frame 302, which separate the heat transfer fluid area 324 from the liquid desiccant header areas 320, 322, respectively. The internal weld portions of the welds 428, 430, 432 may be formed between the sheet 326, 328 and the frame 302 only. This may prevent creating welds that extend across the desiccant channel 336, 338 below the apertures 360 and/or above the apertures 362 and between the membrane 332, 334 and the sheet 326, 328, which may otherwise restrict or impede flow of the liquid desiccant in the desiccant channel 336, 338 between the header areas 320 and 322.

As described above, the membrane 332, 334 may be made from a translucent material, such as a translucent thermoplastic or polymer (e.g., polypropylene), that has a suitable laser transmissivity to enable light emitted from a laser (e.g., the working element 410) to pass therethrough. The plate 326, 328 may also be made from a translucent thermoplastic or polymer with laser transmissivity. Laser transmissivity of the membrane 332, 334 and/or frame 326, 328 may additionally and/or alternatively be facilitated using translucent coating (e.g., oil) that may be subsequently removed after welding. The frame 302 may include laser-absorbing additives (e.g., carbon black) that enable the frame to absorb light emitted from the laser, heating and melting the frame at suitable locations such that, when the frame cools and solidifies, the welds 428, 430, and 432 are formed. Additionally, and/or alternatively, the frame 302 may be made from a laser-absorbing thermoplastic or polymer. The translucent membrane 332, 334 and sheet 326, 328 enable laser welding the frame 302 and the sheet with the membrane 332, 334 attached (e.g., heat sealed) to the plate, without forming a weld between the membrane and the sheet. The laser (e.g., the working element 410) may be operated to emit light at a suitable wavelength selected based on the transmissivity of the translucent membrane 332, 334 and sheet 326, 328 and the laser-absorption capability of the frame 302.

Inserting the alignment pins 406 through the pairs of corresponding frame and sheet alignment features 388, 389 when the sheet 326, 328 is positioned 510 on and attached 512 to the frame 302 suitably facilitates controlling alignment of the sheet and the frame and preventing "mis-welds." In particular, the pairs of corresponding frame and sheet alignment features 388, 389, with the alignment pins 406 inserted therein, ensure that the welds 428, 430, and 432 are properly formed to seal the sheet 326, 328 around the heat transfer fluid area 324 and the liquid desiccant header areas 320, 322 thereby preventing against flow of heat transfer fluid entering the desiccant channel 336, 338 and/or flow of liquid desiccant entering the heat transfer fluid channel 330. Controlling alignment between the sheet 326, 328 and the frame 302 also suitably facilitates ensuring that the apertures 360, 362 are properly aligned with the liquid desiccant header areas 320, 322, respectively, and that there is minimal overlap between the welds used to attach 512 the sheet to the frame and the heat seals used to attach 506 the membrane 332, 334 to the sheet.

The frame and sheet flexures 392, 393 may also operate to control alignment between the sheet 326, 328, the frame 302, and the laser welding tool as well as tension in the sheet and the frame when positioned on the work platform. As described above, the sheet flexures 393 (FIG. 13) compensate for dimensional variations (e.g., height variations) in the sheet 326, 328 that may result from manufacturing tolerances and cause variations in the vertical spacing between the alignment holes 391. The frame flexures 392 (FIGS. 10E and 10F) also operate to compensate for dimensional variations (e.g., height variations) in the frame 302 that may result from manufacturing tolerances and cause variations in the vertical spacing between the alignment holes 390. As described above, the propensity for such variations may be exacerbated, for example, when thermoplastic or polymer materials (e.g., polyolefins such as polypropylene and/or polyethylene) are used to make the sheet 326, 328 and/or the frame 302. The sheet and frame flexures 392, 393 enable the respective alignment holes 390, 391 to flex, which facilitates reducing the negative impact that manufacturing tolerances may have on the alignment between the sheet 326, 328, the frame 302, and the laser welding tool by reducing or eliminating any deformation (e.g., bending or stretching) in the sheet and frame in the areas that require precise alignment with the laser welding tool. Furthermore, the frame flexures 392 and the sheet flexures 393 independently operate (i.e., allow the respective alignment hole 390, 391 to flex independent of the other alignment hole 391, 390) to facilitate controlling tolerance stack between variations in the dimensions of the frame and the sheet.

The laser welding tool (e.g., the tool 408) may be operable to weld the sheet 326, 328 to the frame 302 in a single welding operation, such that the laser welding tool forms, stamps or punches each of the welds 428, 430, 432 in one simultaneous stroke. This requires precise alignment between the laser welding tool, the sheet 326, 328, and the frame 302 to ensure that the welds are not misaligned. Suitably, the flexible frame and sheet alignment features 388, 389, with the alignment pins 406 of the work platform 404 inserted through corresponding pairs thereof, operate to control alignment, tension, tolerance stack, and movement between the frame 302, the sheet 326, 328, and the laser welding tool such that the laser welding can be performed in a single operation.

Example systems and methods described include assembling multilayer panels suitable for use in three-way heat exchangers for removing heat and moisture from a flow of air and/or rejecting heat and moisture into a flow of air. An example multilayer panel includes a frame, two sheets attached to the frame to define a heat transfer fluid channel, and a membrane attached to each sheet to define desiccant channels. The manufacturability and assembly of the multilayer panel is improved by flexible alignment features of the frame and the sheets that facilitate controlling alignment and manufacturing tolerances when attaching the membranes to the respective sheets and when attaching the sheets to the frame. The flexible alignment features enable precise alignment which facilitates attaching the membranes to the sheets using a single operation and attaching the sheets to the frame using a single operation. Heat seals are advantageously formed between the membranes and the respective sheets for facilitating controlling flow and/or distribution of the liquid desiccant through the desiccant channels. Welds are advantageously formed between the sheets and the frames to facilitate preventing against flow of heat transfer fluid and liquid desiccant in undesired areas of the multilayer panel. The heat seals and welds are also suitably located to minimize overlap between the heat seals and the welds and minimize energy applied to the sheets and the membranes.

Embodiments of HVAC systems and methods of operating the systems are described above in detail. The systems and methods are not limited to the specific embodiments described herein, but rather, components of the system and methods may be used independently and separately from other components described herein. For example, the systems and methods described herein may be used in systems other than HVAC systems.

When introducing elements of the present disclosure or the embodiment(s) thereof, the articles "a", "an", "the" and "said" are intended to mean that there are one or more of the elements. The terms "comprising," "including," "containing" and "having" are intended to be inclusive and mean that there may be additional elements other than the listed elements. The use of terms indicating a particular orientation (e.g., "top", "bottom", "side", "vertical", "lateral", "longitudinal", etc.) is for convenience of description and does not require any particular orientation of the item described.

The terms "about," "substantially," "essentially" and "approximately," and their equivalents, when used in conjunction with ranges of dimensions, concentrations, temperatures or other physical or chemical properties or characteristics is meant to cover variations that may exist in the upper and/or lower limits of the ranges of the properties or characteristics, including, for example, variations resulting from rounding, measurement methodology or other statistical variation.

As various changes could be made in the above constructions and methods without departing from the scope of the disclosure, all matter contained in the above description and shown in the accompanying drawing(s) shall be interpreted as illustrative and not in a limiting sense.

What is claimed is:

1. A method of assembling a multilayer panel for use in a heat exchanger, the method comprising:
   positioning a frame on a work platform, the frame having two header sections and a middle section, the middle section defining a heat transfer fluid area and each header section defining a frame alignment feature;
   positioning a heat exchange sheet on the frame across the middle section and each header section, the heat exchange sheet having two sheet alignment features each corresponding to one of the frame alignment features, wherein at least one of the two sheet alignment features includes a flexure formed within the heat exchange sheet, the flexure defining a flexible region on the heat exchange sheet;
   inserting an alignment pin of the work platform into each of the corresponding frame and sheet alignment features; and
   welding the heat exchange sheet to the frame.

2. The method of claim 1, wherein each of the header sections of the frame defines a header area and the heat exchange sheet has two series of apertures, wherein each of the two series of apertures are located proximate one of the sheet alignment features, wherein positioning the heat exchange sheet on the frame comprises aligning each of the series of apertures with one of the header areas.

3. The method of claim 2, wherein welding the heat exchange sheet to the frame comprises forming a middle weld enveloping the heat transfer fluid area, the middle weld located between the two series of apertures.

4. The method of claim 3, wherein welding the heat exchange sheet to the frame comprises forming the middle weld and the two outer welds, each of the outer welds enveloping a corresponding one of the header areas and the corresponding series of apertures.

5. The method of claim 4, wherein welding the heat exchange sheet to the frame comprises forming the middle weld and the two outer welds in a single welding operation.

6. The method of claim 2, wherein inserting the alignment pin of the work platform into each of the corresponding frame and sheet alignment features operates to control alignment between each series of apertures and the corresponding header area during the welding of the heat exchange sheet to the frame.

7. The method of claim 2, further comprising attaching a membrane to the heat exchange sheet.

8. The method of claim 7, wherein attaching the membrane to the heat exchange sheet is performed prior to welding the heat exchange sheet to the frame.

9. The method of claim 7, wherein attaching the membrane to the heat exchange sheet comprises forming heat seal lines adjacent each of the series of apertures to define a desiccant channel extending between and connected to the two series of apertures, wherein alignment between the heat seal lines and the series of apertures is controlled by each of the alignment pins received within the corresponding sheet alignment features.

10. The method of claim 9, wherein attaching the membrane to the heat exchange sheet further comprises forming discrete heat seals between the two series of apertures.

11. The method of claim 10, wherein the heat seal lines and the discrete heat seals are formed in a single heat sealing operation.

12. The method of claim 1, further comprising controlling tolerance stack between the frame and the heat exchange sheet using the flexure formed within the heat exchange sheet and a flexure of a corresponding frame alignment feature formed within the frame.

13. The method of claim 1, wherein the heat exchange sheet and the frame each include a thermoplastic material.

14. A method of assembling a multilayer panel for use in a heat exchanger, the method comprising:
positioning a frame on a work platform, the frame having two header sections and a middle section, the middle section defining a heat transfer fluid area and each header section defining a frame alignment feature;
positioning a heat exchange sheet on the frame across the middle section and each header section, the heat exchange sheet having two sheet alignment features each corresponding to one of the frame alignment features;
attaching a membrane to the heat exchange sheet;
inserting an alignment pin of the work platform into each pair of corresponding frame and sheet alignment features; and
welding the heat exchange sheet to the frame,
wherein each of the header sections of the frame defines a header area and the heat exchange sheet has two series of apertures, wherein each of the two series of apertures are located proximate one of the sheet alignment features, wherein positioning the heat exchange sheet on the frame comprises aligning each of the series of apertures with one of the header areas,
wherein attaching the membrane to the heat exchange sheet comprises forming heat seal lines adjacent each of the series of apertures to define a desiccant channel extending between and connected to the two series of apertures.

15. The method of claim 14, wherein attaching the membrane to the heat exchange sheet further comprises forming discrete heat seals between the two series of apertures.

16. The method of claim 15, wherein the heat seal lines and the discrete heat seals are formed in a single heat sealing operation.

17. The method of claim 14, further comprising controlling tolerance stack between the frame and the heat exchange sheet using flexures at each of the pairs of corresponding frame and sheet alignment features.

* * * * *